United States Patent
Aimoto et al.

[19]

[11] Patent Number: 6,122,252
[45] Date of Patent: Sep. 19, 2000

[54] PACKET SWITCHING DEVICE AND CELL TRANSFER CONTROL METHOD

[75] Inventors: Takeshi Aimoto, Sagamihara; Takeki Yazaki, Kokubunji; Yoshihiko Sakata; Nobuhito Matsuyama, both of Hadano, all of Japan

[73] Assignees: Hitachi, Ltd., Tokyo; Hitachi Information Technology Co., Ltd., Kanagawa, both of Japan

[21] Appl. No.: 08/879,906

[22] Filed: Jun. 20, 1997

[30] Foreign Application Priority Data

Jun. 21, 1996 [JP] Japan ..................................... 8-161430

[51] Int. Cl.[7] .................................................. H04L 12/56
[52] U.S. Cl. .......................... 370/235; 370/395; 370/416; 370/418
[58] Field of Search ..................................... 370/229, 230, 370/232, 395, 398, 412, 413, 414, 417, 235, 416, 418

[56] References Cited

U.S. PATENT DOCUMENTS

| | | | |
|---|---|---|---|
| 5,282,203 | 1/1994 | Oouchi | 370/232 |
| 5,519,689 | 5/1996 | Kim | 370/232 |
| 5,550,823 | 8/1996 | Irie et al. | 370/413 |
| 5,555,265 | 9/1996 | Kakuma et al. | 370/395 |
| 5,745,488 | 4/1998 | Thompson et al. | 370/392 |
| 5,764,641 | 6/1998 | Lin | 370/412 |
| 5,774,453 | 6/1998 | Fukano et al. | 370/231 |
| 5,822,540 | 10/1998 | Caldara et al. | 709/236 |
| 5,838,677 | 11/1998 | Kozaki et al. | 370/389 |

OTHER PUBLICATIONS

'Data Communication Using ATM: Architecture, Protocols, and Resource Management,' IEEE Communication Magazine, Aug. 1994, pp. 24–31.
'SVC Signaling: Calling All Nodes,' Data Communications, Jun. 1995, pp. 123–128.
ITU–T Standards Q.2931.
'Multimedia Traffic Management Principles for Guaranteed ATM Network Performance,' IEEE Journal on Selected Areas in Communication, vol. 8, No. 3, Apr. 1990, pp. 437–446.
'Traffic Management for B–ISDN Services,' IEEE Network, Sep. 1992, pp. 10–19.
'The Rate–Based Flow Control Framework for the Available Bit Rate ATM Service,' IEEE Network, Mar./Apr. 1995, pp. 25–39.

*Primary Examiner*—Chau Nguyen
*Assistant Examiner*—Soon-Dong Hyun
*Attorney, Agent, or Firm*—Mattingly, Stanger & Malur

[57] ABSTRACT

Cells are discarded in conformity with the order of priority when congestion occurs by discarding cells of a traffic class without any special contract for a transfer rate at the time of setting up a connection. A node stores priority information concerning cell discard corresponding to a connection identifier and controls the cell discard in accordance with the discard condition determined by the accumulated number of cells for each connection in the node and cell priority.

7 Claims, 23 Drawing Sheets

PACKET SWITCHING DEVICE AND CELL TRANSFER CONTROL METHOD

FIELD OF THE INVENTION

The present invention relates to a packet switching device and to a fixed length packet transfer control method, and more particularly to an ATM (Asynchronous Transfer Mode) packet switching device having a congestion control function and to a cell transfer control method in an ATM network.

BACKGROUND OF THE INVENTION

A fixed length packet (hereinafter referred to as a cell) transfer in an ATM network has been described in, for example, 'Data Communication Using ATM: Architecture, Protocols, and Resource Management,' IEEE Communication Maggin August 1994, pp. 24–31, 'SVC Signaling: Calling All Nodes' DATA COMMUNICATIONS JUNE 1995, pp. 123–128 and so forth.

In an ATM network, a call (connection) is set along a communication channel extending from a sending-side device (calling terminal) as the transfer path of a user cell via a switching device (switch) up to a receiving-side device (called or destination terminal), depending on the signaling process at the time of calling. The cell transfer is controlled on the basis of the connection identifying information attached to the header of each user cell.

A call setting procedure has been mentioned in, for example, ITU-T Standards Q.2931 and by performing the call setting procedure, connection information is set in the sending-side device, each node (switch) on the communication channel and the receiving-side device. The communication channel includes an identifier for identifying a call on each of the links between the sending side and the switch between the terminals, between the switch and the receiving side, a traffic class indicating the cell transfer priority among the switches and so forth. The identifier for identifying the connection (call) is called a VPI (Virtual Pass Identifier) and a VCI (Virtual Connection Identifier), which are set as address information in the header of each cell.

Connection information necessary for the switching processing according to the VPI, VCI of each input cell received through a transmission line is retrieved at each switch. The connection information includes internal routing information (output port number), an identifier (output VPI/VCI) to be attached to an output cell, a traffic class showing the cell priority within the switch and so forth.

The traffic class indicative of the cell priority has been described in, for example, 'Multimedia Traffic Management Principles for Guaranteed ATM Network Performance' IEEE JOURNAL ON SELECTED AREAS IN COMMUNICATIONS VOL. 8, NO. 3, APRIL 1990, pp. 437–446 and 'Traffic Management for B-ISDN Services' IEEE Network, September 1992, pp. 10–19.

There are two traffic classes, for example, showing cell priority: CBR (Constant Bit Rate) and VBR (Variable Bit Rate). The CBR is a traffic class for ensuring that on the basis of a contract between the network and the terminal for a predetermined cell transfer rate at the time of the setting of a call, the network side insures the cell transfer at the aforementioned transfer rate, whereas the VBR is a traffic class for allowing the occurrence of a statistical swing to a certain degree concerning the transfer rate contracted with the terminal. A traffic control method is called 'Preventive Control, and is based on the contract placed between the network and the terminal.

There are also a group of traffic classes called 'Best Effort Control' which perform transmission by utilizing the remainder of the band allocated to other terminals at the aforementioned CBR, VBR without any special contract concerning the transfer rate between the network and the terminal at the time of setting a call. One of the reasons for the transfer rate contract not to be held is that the terminal for outputting burst traffic is hardly able to predict traffic characteristics at the time of setting a call.

In the group of Best Effort Control traffic classes are an UBR (Unspecified Bit Rate) traffic class in which the network assures no transfer and an ABR (Available Bit Rate) traffic class which assures the generation of no cell loss by effecting feedback control during congestion between the network and the terminal. Incidentally, the ABR traffic class has been described in, for example, 'The Rated-Based Flow Control Framework for the Available Bit Rate ATM Service' IEEE Network March/April 1995, pp. 25–39.

With respect to a switch arrangement for effecting transfer control in accordance with the traffic class, Japanese Patent Laid-Open No. 197128/1994 (prior art 1), for example, describes a packet switching device wherein two output buffers for CBR and VBR classes are provided at each output port so as to store table information representing empty/filled state of the two buffers corresponding to the output port, so that by referring to the table information, an input buffer control unit determines a storage buffer of a cell to be sent to each output port. In this case, the output priority of the cell stored in the CBR buffer is set higher than that of the cell stored in the VBR buffer, whereby communication delay in the switch can be suppressed to a range of predetermined values with respect to the cell group of the CBR traffic whose communication delay is under severe restriction.

In cases where the CBR buffer is not empty, for example, cells are accumulated in the VBR buffer on condition that space exists in the VBR buffer, so that the band within the switch may be efficiently utilized effectively be utilizable. When the ABR, VBR traffic classes are supported, an output buffer corresponding to another traffic class in addition to the CBR, VBR traffic classes may be added.

The technique proposed in 'Development of 622 Mbps 8'8 ATM Switch LSI Having 5-Class Delay Priority Control Function', at the 1996 National Convention B-598, the Institute of Electronics, Information and Communication Engineers of Japan (prior art 2) provides counter information of the number-of-cells for each connection and threshold information for each connection within the same traffic class, with respect to each traffic class of CBR, VBR, are stored in a switch. When the value of the number-of-cells counted exceeds the threshold, cell discard is carried out.

Further, the technique proposed in 'Selective Cell Discard Method by Counter Control' at the 1996 National Convention B-765, the Institute of Electronics, Information and Communication Engineers of Japan (prior art 3), for example, proposes that a delimiter in a host protocol packet (information unit handled under the upper-order protocol and comprising a plurality of cells) is recognized and when congestion occurs, selective continuous cell discard otherwise known as selective cell discard, is carried out in units of a packet.

Regarding a switching system configuration for dealing with ATM cells, Japanese Patent Laid-Open No. 276943/1992 (prior art 4) describes providing a common cell storage buffer with respect to a plurality of output ports instead of providing a physically independent buffer for each output port.

SUMMARY OF THE INVENTION

As set forth above, though several traffic classes have already been proposed in asynchronous communication, it is desired to control cell transfer in such a form that characteristics are subdivided within each traffic class in addition to putting these traffic classes to proper use. However, in the case of a traffic class which provides no special assurance to the cell transfer like UBR, for example, there is no means for controlling the quality of service that belongs to these traffic classes when the network falls into congestion. Although the technique of deciding whether to discard the cell more minutely with control according to the threshold for each connection within the same traffic class has been indicated in the prior art 2, the division of the cell buffer simply by the threshold allows a cell exceeding the threshold to be discarded even when the cell buffer has not yet reached the congestion state and the problem is that the efficiency of use of the whole cell buffer lowers.

An object of the present invention is to provide a packet processing apparatus for controlling the quality of service without lowering the efficiency of use of the whole cell buffer about a group of Best Effort Control traffic classes without any contract of the transfer rate between the network and the terminal at the time of setting a call, and a cell transfer control method.

Another object of the present invention is to provide a node such as an ATM switching device capable of controlling selective cell discard during congestion about a group of traffic classes in which it is difficult to arrange bandwidth reservation from the terminal device at the time of setting a call, and an ATM cell transfer control method.

In order to accomplish the objects above, a method of controlling the transfer of a fixed length packet according to the invention includes: storing information indicating a priority concerning the cell discard reported by a sending-side device or a network management device corresponding to a connection identifier in one of the nodes within an ATM (asynchronous Transfer Mode) network for which a specific traffic class without bandwidth reservation is set. The input cells are stored in a buffer and then transferred through the channel corresponding to the connection identifier of each input cell. Selective discard processing is performed at the node corresponding to the congestion degree of the cell which belongs to the specific traffic class in accordance with the discard condition determined by the relation between the state of the cell buffer and priority when congestion occurs on the connection and when cells stay in the cell buffer holding output-waiting cells within the node.

More specifically, the node always holds, for example, an updated counter value for each connection, resulting from counting the number of cells staying in the cell buffer and decides whether to discard each cell which belongs to the specific traffic class in accordance with the discard condition determined by the priority and the counter value for each connection. Further, the node always holds updated cell buffer counter values resulting from counting the total number of cells staying in the cell buffer; adds weight to the predetermined discard condition at the time of cell buffer congestion only in accordance with the relation determined by a cell buffer threshold for use in judging the congestion of the whole cell buffer and the total number of cells; and selectively discards the cell which belongs to the specific traffic class in accordance with the discard condition with the weight thus added. In this case, each cell which belongs to the specific traffic class may be judged from whether the data block contained in the data portion of the cell concerned is what is divided from the same transmission message as that in the data portion of the preceding cell or what is divided from a new transmission message, so that the cell which meets the discard condition may be discarded in units of a transmission message.

The discard processing is started with, for example, any cell which meets the discard condition predetermined by the relation between the congestion state and the priority and even though the cell fails to meet the discard condition as the congestion state varies, the discard processing is continuously applied to the following cell containing part of the same transmission message as that in the data portion of discarded cell. For example, a cell containing the data block of the same transmission message as that in the data portion of the transmitted cell out of those which meet the discard condition is excluded from being discarded and the discard processing may be started with a cell containing the first data block of a new succeeding message.

According to the present invention, a packet switching device which is connected to a plurality of input lines and a plurality of output lines and adapted to output a fixed length packet (cell) fed through the input line to one output line which is determined by the header information of the input cell stored sub-class information indicative of priority concerning the cell discard reported by a calling device or a network management device in accordance with a connection identifier for a connection in which a specific traffic class without bandwidth reservation is set. The congestion state is detected corresponding to the output port, and the discard processing is performed in accordance with the discard condition determined by the relation between the congestion state of the output port to which the cell is sent and the sub-class information.

More specifically, a packet switching device according to the present invention has a switch having a plurality of input ports and a plurality of output ports. The switch is used for transferring a fixed length packet (cell) fed through each input line to one output line determined by the cell header information, an input line interface unit which is connected between each input port and the input line and an output line interface unit which is connected between each output port and the output line. A call control device is connected to the switch and each input port interface unit and is used for transmitting and receiving call control information to and from the switch and transmission control information including header rewrite information to the input interface unit. A congestion monitor detects the congestion state of the output cell for each connection and for each output port and reports the congestion state information to each input interface unit.

Further, the call control device has means for reporting connection identifying information, traffic information reported in a control message by the calling device and sub-class information indicative of priority concerning the cell discard to the input interface unit containing the calling device which is the device demanding the set-up of the connection. Each input line interface unit is provided with cell discard control for selectively discarding a cell in accordance with the discard condition determined by congestion state in the cell buffer of the user cell identified by the congestion state information, the congestion state of the cell buffer of each connection and the priority concerning the cell discard reported by the calling device, with respect to the specific traffic class for each input line after the connection is set up.

Each of the input line interface units is provided with, for example, header conversion means for rewriting the header information from the input line to the input cell and input buffer means for temporarily storing the cells that have been subjected to the header conversion. The cell discard control means selectively stores the input cell of the specific traffic in the input buffer means in accordance with the discard condition.

The switch has an output buffer that corresponds to each output port and distributes each user cell thus converted in the input line interface unit to any output buffer specified by the header information. The congestion monitor detects the congestion state of the output cell from the accumulated condition of the user cells in the output buffer.

The switch means may be provided with a plurality of output buffers for each output port and one of the output buffers may be allocated to a cell of the CBR traffic class where the transfer rate is assured. Further, the output buffer within the switch may hold cells from a plurality of output ports in common and the congestion monitor may monitor the empty buffer capacity of the output buffer corresponding to the plurality of output ports. When the output buffer within the switch is commonly used, the cell discard control means and the input buffer means may be installed within the switch instead of as part of each input line interface unit.

With this arrangement according to the present invention, the priority information concerning the cell discard is defined as the sub-class with respect to the traffic class that is without bandwidth reservation as in the case of a group of the above-described Best Effort Control traffic classes (e.g. the UBR class). When a call is set, the calling terminal is caused to report the priority to the network. When a congestion state occurs in the Best Effort Control class, discard is started with the cell of the connection having the lowest priority according to the priority information designated in the sub-class out of the cells in the same traffic class so that the cells having higher priority are not discarded. If the degree of congestion increases, however, even though the cell discard is effected, the cells of connections having the high priority are subjected to cell discard. As the congestion is recovered, the suspension of the discard process is started with the cells of the connection having the higher priority in order, whereby it is possible to ensure the quality of service at the connection having higher priority in the group of Best Effort Control traffic classes.

DETAILED DESCRIPTION OF THE PREFERRED EMBODIMENTS

A description will subsequently be given of an ATM switching device which is provided with FIFO buffer output buffer for each output port and used for cell transfer control, handling the CBR as priority traffic, as a first embodiment of the invention.

Figure 1:
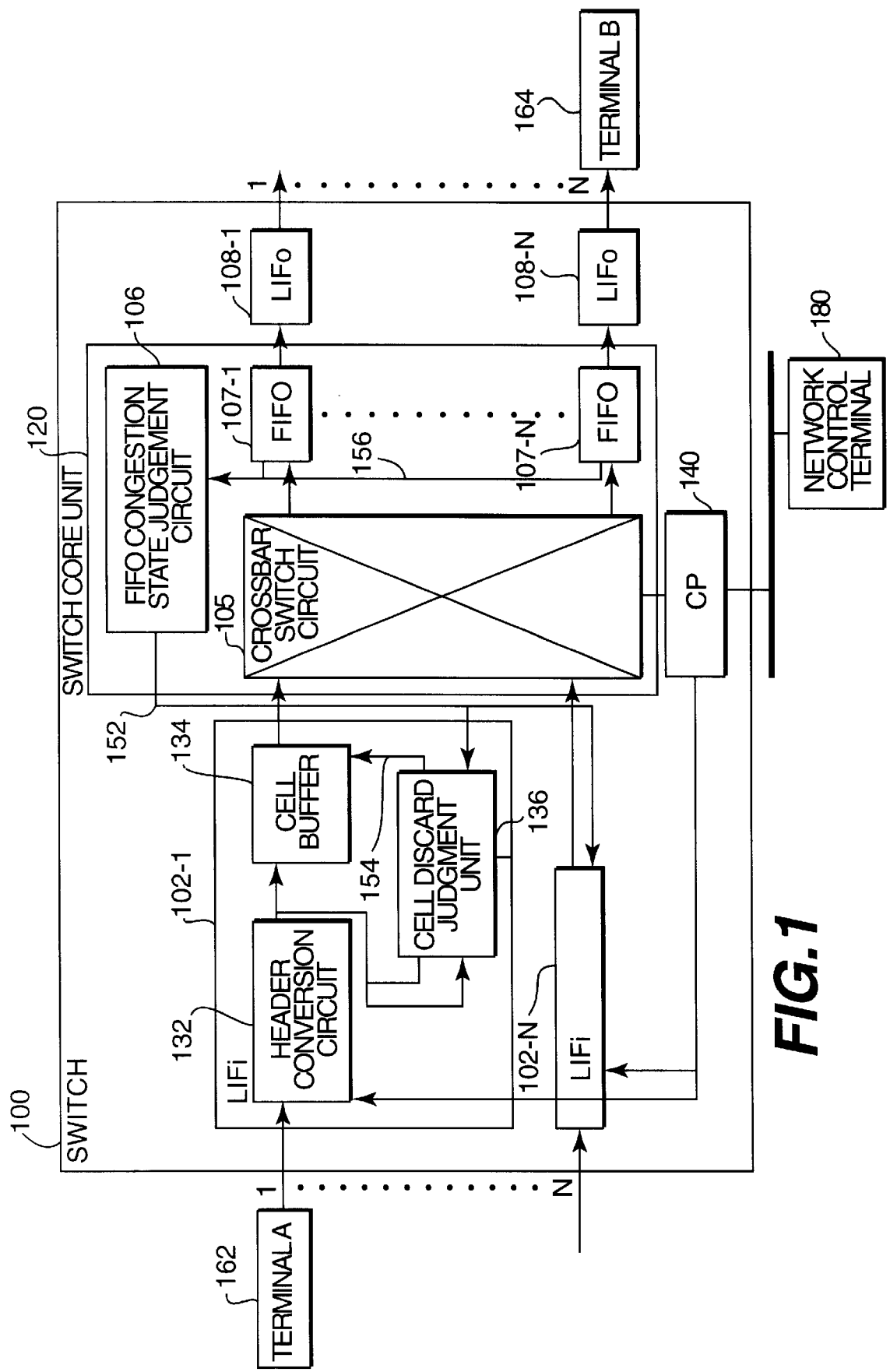
FIG. 1 is a block diagram of a packet switching device embodying the present invention.

FIG. 1 shows a configuration of an ATM switching device (switch) 100 this is connected between N input lines and N output lines.

Although the switch is shown to have a network configuration with two terminal devices A 162, B 164 accommodated via an input/output line (subscriber's lines) for simple description, part of the input/output lines may be a trunk for use in connecting the switch 100 to another switch. In this example, moreover, the terminal A 162 is placed on the left of the switch 100 and the cell sent out of the terminal is transferred to the terminal B 164 placed on the right of the switch. However, the i-th input line and the i-th output line form a pair in an actual switch, and an output cell from the first output line of FIG. 1 is input to the terminal A, whereas the cell sent out of the terminal B is input to the N-th input line. A network control terminal 180 is used for controlling the network.

The switch 100 comprises a plurality of input line interface units LIFi 102 (102-1 to 102-N) corresponding to the respective input lines, a switch core unit 120, a plurality of output line interface units LIFo 108 (108-1 to 108-N) corresponding to the respective output lines, and a call control unit (connection processing unit: CP) 140. Each input line interface unit 102 further comprises a header conversion circuit 132, cell discard judgment unit 136 and a cell buffer 134. The switch core unit 120 comprises a crossbar switch circuit 105, a plurality of units FIFO buffer 107 (107-1 to 1007-N) corresponding to the respective output lines and a congestion state measurement circuit 106.

Figure 2A:
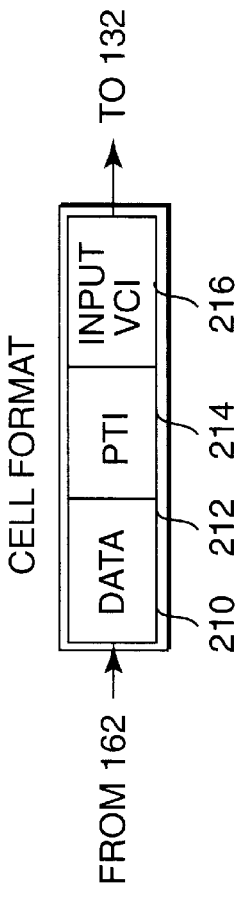
FIGS. 2A, 2B and 2C are diagrams showing examples of an input cell, an internal cell and a control message format, respectively.

FIG. 2(A) shows a format of a cell 210 that is input to the input line interface unit of the switch 100 through each input line.

A message (packet) to be transmitted from the terminal A to the terminal B is divided into a plurality of fixed length data blocks and a cell header is attached to each data block to form a cell 210. Each cell 210 has a header portion and also a data portion 212. The header portion includes an input VCI 216 and a payload type indicator (PTI) 214 indicating where the data block contained in the data portion 212 is positioned in the packet (transmission message) dealt with under the host protocol. In the following description, the cell that contains the first data block of the upper-order packet will be called the packet delimiter.

Figure 2B:
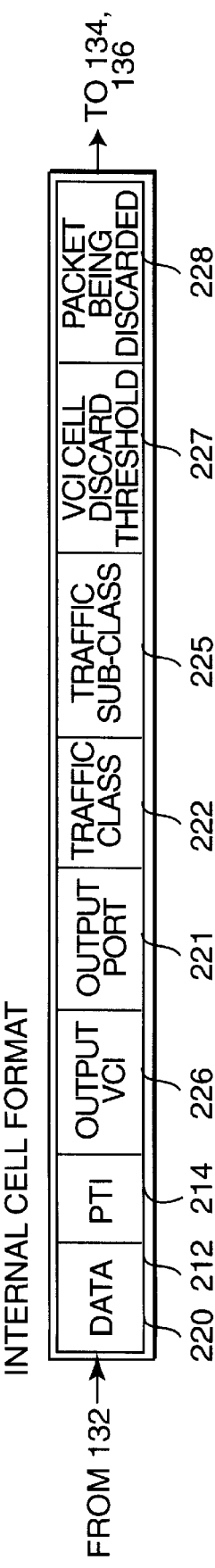

When the input cell 210 is supplied through an input line, the header conversion circuit 132 reads the header conversion information corresponding to the input VCI 216 of the aforementioned cell from the header conversion table and converts the information into the format of an internal cell 220 of FIG. 2(B).

To the header portion of the internal cell 220, the following information is added: an output VCI 226 in place of the input VCI 216 of the input cell 210; routing information (output port information) 221; a traffic class 222, a sub-class 225; a cell discard threshold 227 indicating a threshold for each connection; and packet discard condition information 228 showing whether the packet of the VCI is being discarded. The internal cell 220 is sent to the switch core unit 120 via the crossbar switch circuit 105 without being discarded in the cell buffer 134 unless congestion has occurred in the output port and to a specific FIFO buffer output buffer 107 indicated by the routing information (output port information).

Figure 2C:

FIG. 2(C) shows a control message (connection information) 230 for setting a call that the terminal 162 sends to the switch 100 prior to communicating with the terminal 164.

The control message 230 comprises destination address information 232 for specifying the destination terminal, traffic class information 234, sub-class information 236 indicating priority concerning the cell discard, a VCI cell discard threshold 238 indicating the discard threshold for each connection and terminal protocol information 250 indicating the upper-order protocol, e.g. ethernet, at a destination terminal. The connection information 230 is divided into a plurality of fixed length blocks at the calling terminal and sent to the switch 100 as a control cell having a format similar to what is obtainable by adding a cell header to each block as shown in FIG. 2(A).

The control cell is sent from the switch core unit 120 via a signal processing means (not shown in FIG. 1) to the call control unit (connection processing unit: CP) 140. The signal processing means is intended to assemble the contents (data blocks) of the data portion 212 into the original connection information (in the form of a message) shown in FIG. 2(C) but it may be arranged as the connection interface of the switch core unit 120, that is, part of the call control unit 140.

The call control unit 140 sets the following in the conversion table (not shown) of the header conversion circuit 132 connected to the calling terminal, in the call setting sequence executed in response to the connection information: the output VCI 226 allocated to the call, the output port information 221 specified by the destination address, the traffic class 234 extracted from the connection information 230 and the traffic sub-class 236. Moreover, the call control unit 140 sets the aforementioned contents in the conversion table (not shown) of the header conversion circuit 132 likewise. When the setting of the terminal-to-terminal call (connection) is completed, the calling terminal 162 starts sending out the cell (user cell) 210 to the terminal 164.

Figure 3:
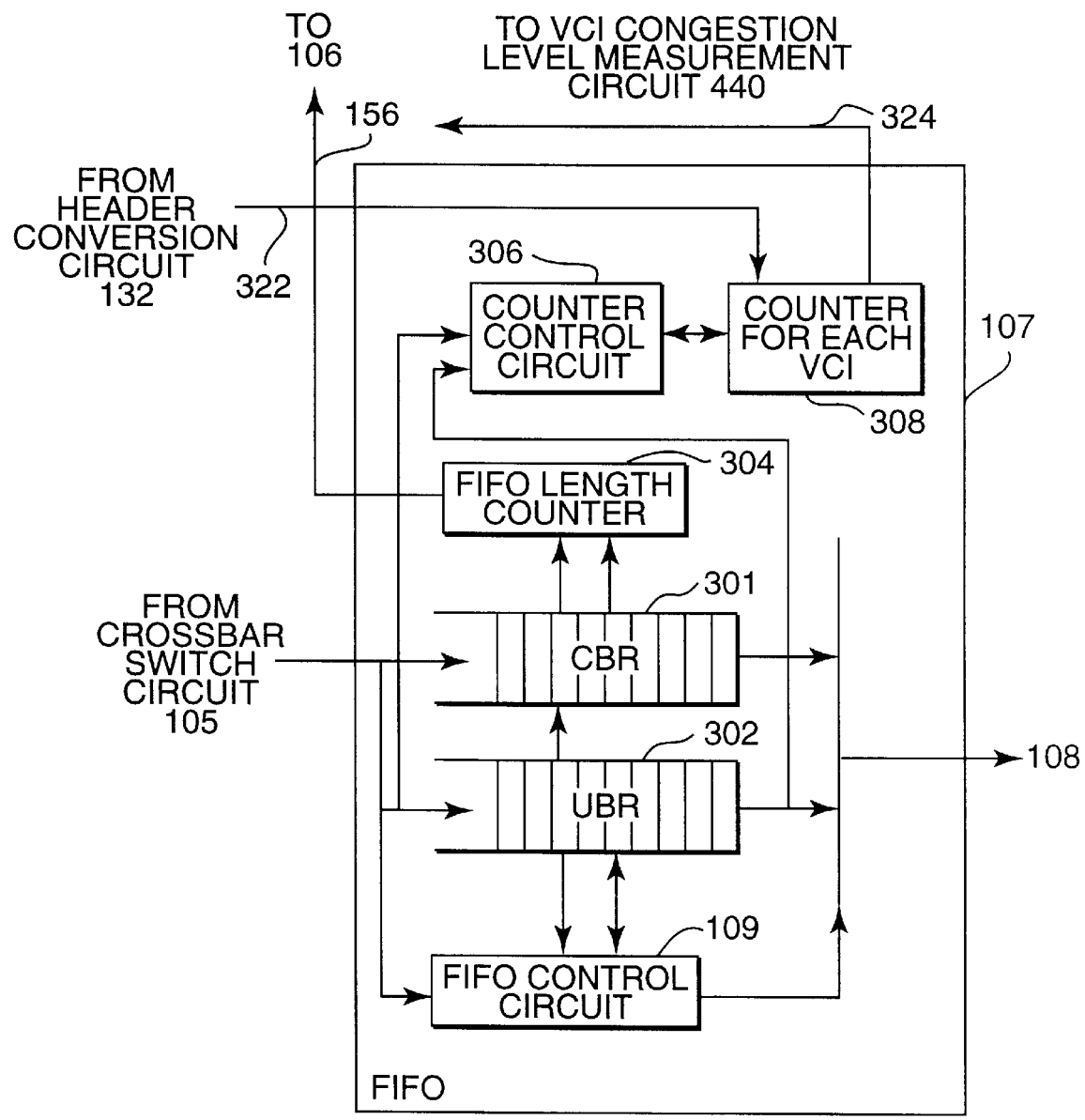
FIG. 3 is a block diagram of an FIFO buffer output buffer 107 of FIG. 1 according to the present invention.

FIG. 3 shows an exemplary configuration of the FIFO buffer output buffer 107.

The FIFO buffer output buffer 107 comprises a FIFO buffer 301 for the CBR class, a FIFO buffer 302 for the UBR class, a FIFO buffer control circuit 109, a FIFO buffer length counter 304, a counter control circuit 306 for each VCI, and a counter 308 for each VCI. The FIFO buffer control circuit 109 outputs the cell stored in the FIFO buffer 301 for the CBR, class prior to that of the cell being stored in the FIFO buffer 302 for the UBR class.

Under normal conditions when congestion has not occurred, the user cell that has been output from each FIFO buffer output buffer 107 is input to a corresponding line output control unit LIFo 108i where unnecessary internal header information 222–228 is removed and the resulting cell is sent out with the output cell format formed of the information elements 212–221 to the output line.

Information concerning the storage condition of the cells within an output buffer 107i of each FIFO buffer is provided by the following: the FIFO buffer length counter 304 indicating the number of cells staying in the whole FIFO buffer output buffer 107i and the counter 308 for each VC indicating the number of cells staying in each connection (VCI).

First, the FIFO buffer length counter 304 monitors the cell storage condition for both FIFO buffers 301 and 302 for the CBR, and UBR classes respectively of the FIFO buffer output buffer 107, and the cell storage conditions of the whole FIFO buffer output buffer 107 are collected in a congestion state judgment circuit 106 via a signal line 156. The congestion state judgment circuit 106 edits the cell storage condition so as to provide congestion state information corresponding to the output port and reports the information via a signal line 152 to each input line interface unit 102-1 to 102-N.

A description will subsequently be given of the congestion state judgment circuit 106 in connection with the description given above.

Figure 5:
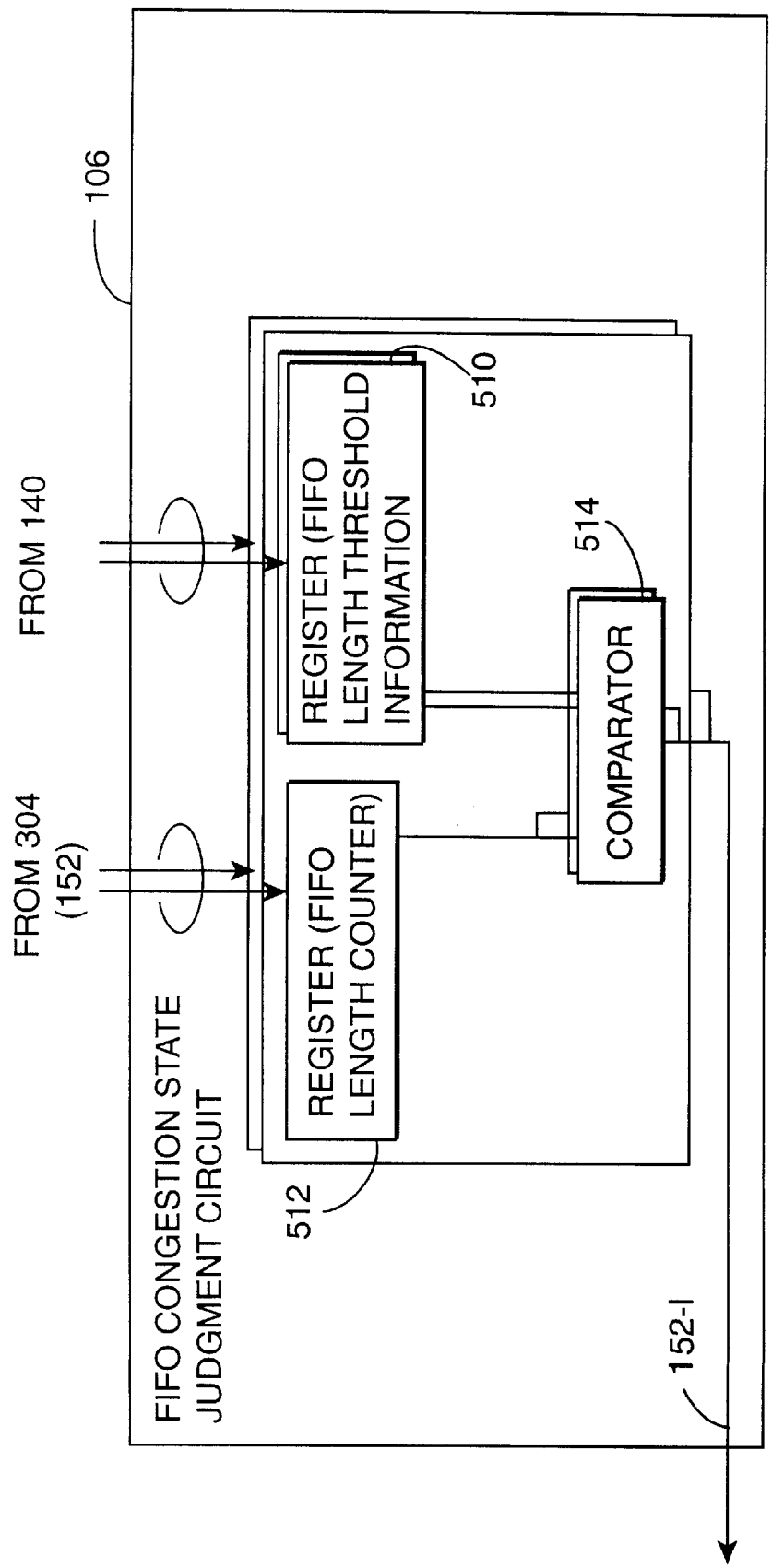
FIG. 5 is a block diagram of an FIFO buffer congestion state judgment circuit 106 of FIG. 1 according to the present invention.

The FIFO buffer congestion state judgment means 106 shown in FIG. 5 is provided with a comparison means for each output line and includes a register 512 for holding FIFO buffer length counter information, a register 510 for holding FIFO buffer length threshold information and a comparator 514. In order to make a decision about a plurality of congestion levels, a plurality of registers 510 and a plurality of comparators 514 may be used. The signals 156 from the FIFO buffer length counter 304 are gathered in the congestion state judgment means 106 and set in the register 512 before being compared with the register 510 which holds FIFO buffer length threshold information in the comparator 514. The result of comparison is sent via the signal line 152 to a line input control unit LIFi 102-i and used as reference information for making a cell discard decision. The congestion state judgment means 106 classifies, for example, the cell accumulation condition as a 'sub-class congestion state' at each output port and edits the condition as the aforementioned congestion state information.

Subsequently, the counter 308 for each VCI operates in cooperation with a counter control circuit 306 for each VCI to hold the present value resulting from the number of cells for each VCI within the FIFO buffer circuit 302. When cells are fed in the FIFO buffer circuit 302 first, the number of cells of the VCI is counted up according to the information on the output VCI 226 of the internal cell format 220 sent from the crossbar switch circuit 105 to the FIFO buffer circuit 302. When the cells are output from the FIFO buffer circuit 302, conversely, the number of cells of the VCI is counted down according to the information on the output VCI 226, whereby the present value of the number of cells by VCI is held in the buffer. When an instruction of a read request is given from a line input control unit LIFi 102, the present value of the number of cells for each VCI held in the counter 308 for each VCI is read and sent to a cell discard judgment circuit 136 within the line input control unit LIFi 102 via a signal line 324.

Figure 4:
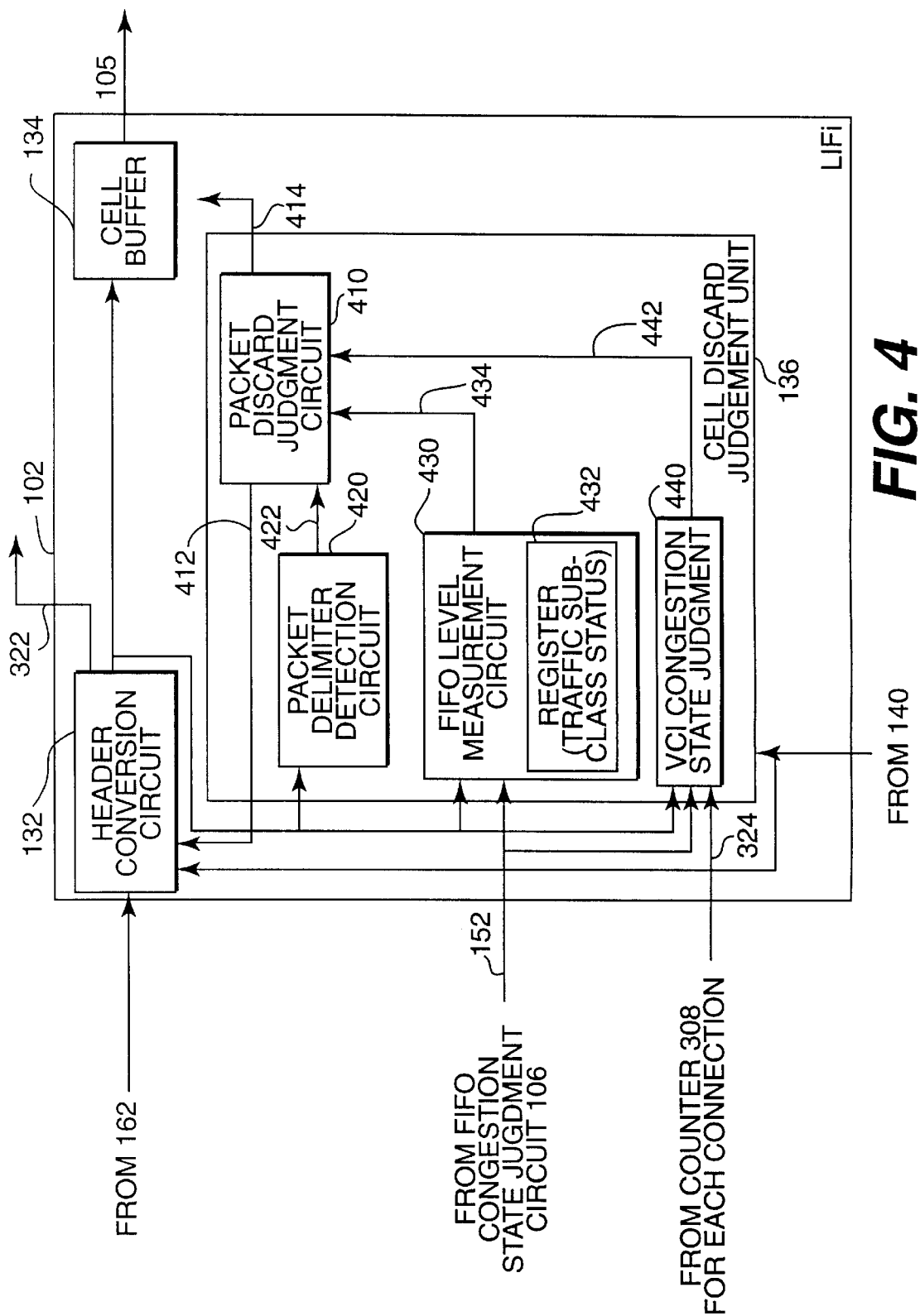
FIG. 4 is a block diagram of a cell discard judgment unit 136 of FIG. 1 according to the present invention.

FIG. 4 is a block diagram of a line input control unit FIFi 102-$i$. The line input control unit FIFi 102-$i$ comprises the header conversion circuit 132, the cell discard judgment unit 136 and the cell buffer 134 as a cell discard means. The cell discard judgment unit 136 comprises a packet delimiter detection circuit 420, a FIFO buffer congestion level measurement circuit 430, a VCI congestion level measurement circuit 440 and a packet discard judgment unit 410.

The packet delimiter detection circuit 420 receives from the header conversion circuit 132 the PTI 214 of the internal cell format 220 and a packet-discarding state 228, detects a packet delimiter and sends the packet delimiter detection result together with the packet-discarding state 228 to the packet discard judgment unit 410 via a signal line 422.

Figure 6:
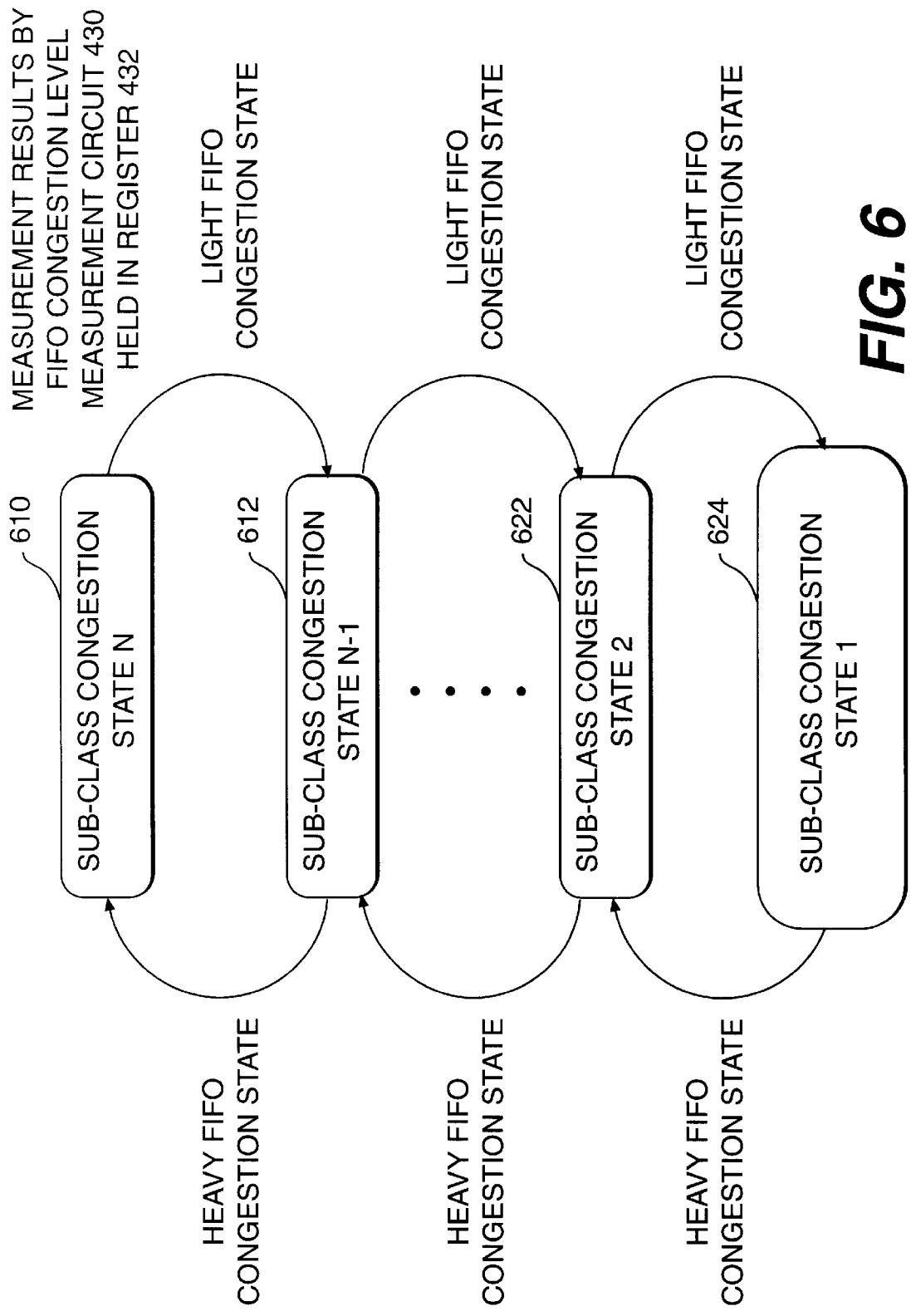
FIG. 6 is a state transition chart showing the function of an FIFO buffer congestion level measurement circuit 430 of FIG. 4 according to the present invention.

The FIFO buffer congestion level measurement circuit 430 receives the traffic sub-class 225 from the header conversion circuit 132 and the congestion information from the FIFO buffer congestion state judgment circuit 106, obtains an active traffic sub-class congestion state for each output line according to the flow described in reference to FIG. 6, holds the obtained result in a register 432 and sends the result of comparison with the traffic sub-class of the received cell via the signal line 434 to the packet discard judgment unit 410.

Figure 8:
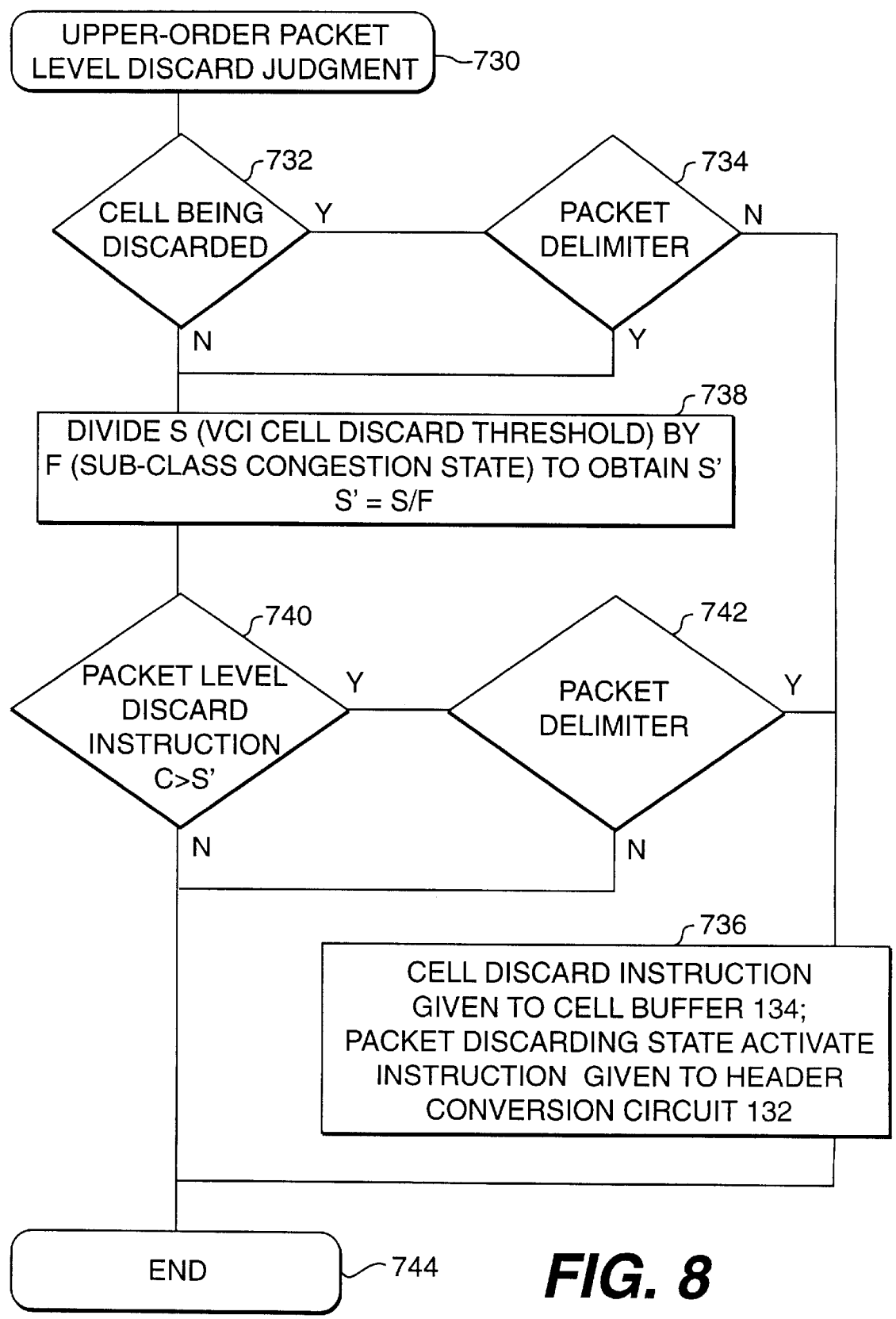
FIG. 8 is a flowchart showing the detail of an upper-order packet level discard judgment of FIG. 7.

The VCI congestion level measurement circuit 440 receives the VCI cell discard threshold 227 from the header conversion circuit 132, the congestion information 152 from the FIFO buffer congestion state measurement circuit 106 and the counter information from counter 308 for each VCI, judges the discard in the congestion state in reference to Steps 738 and 740 of FIG. 8 and sends a congestion discard instructing signal 442, which indicates that the subclass congestion state equals the traffic subclass, to the packet discard judgment unit 410.

The packet discard judgment unit 410 receives from the signal line 422 the packet delimiter signal, from signal line 412 the packet discard condition state 228, the result of comparison with the traffic sub-class of the cell received through the signal line 434 and the equal state congestion discard instructing signal 442. The packet discard judgment unit 410 further processes the flow shown in FIG. 7 and sends an input cell discard instruction 154 to the cell buffer 134 serving as the packet discard means. Upon receiving the discard instruction 154, the cell buffer 134 does not transfer the cell to the switch core unit 120.

FIG. 6 shows the transition of the active traffic sub-class state held in the register 432. The state of the sub-class congestion ranges from N (the heaviest congestion state) to 1 (the lightest congestion state) and when the signal 152 from the FIFO buffer congestion state judgment circuit indicates a heavy congestion state, the sub-class congestion state is incremented by "+1" to a next state (e.g., from 612 to 610); and when it indicates a light congestion state, the sub-class congestion state is decremented by "−1" to a next state (e.g., from 610 to 612).

Figure 7:
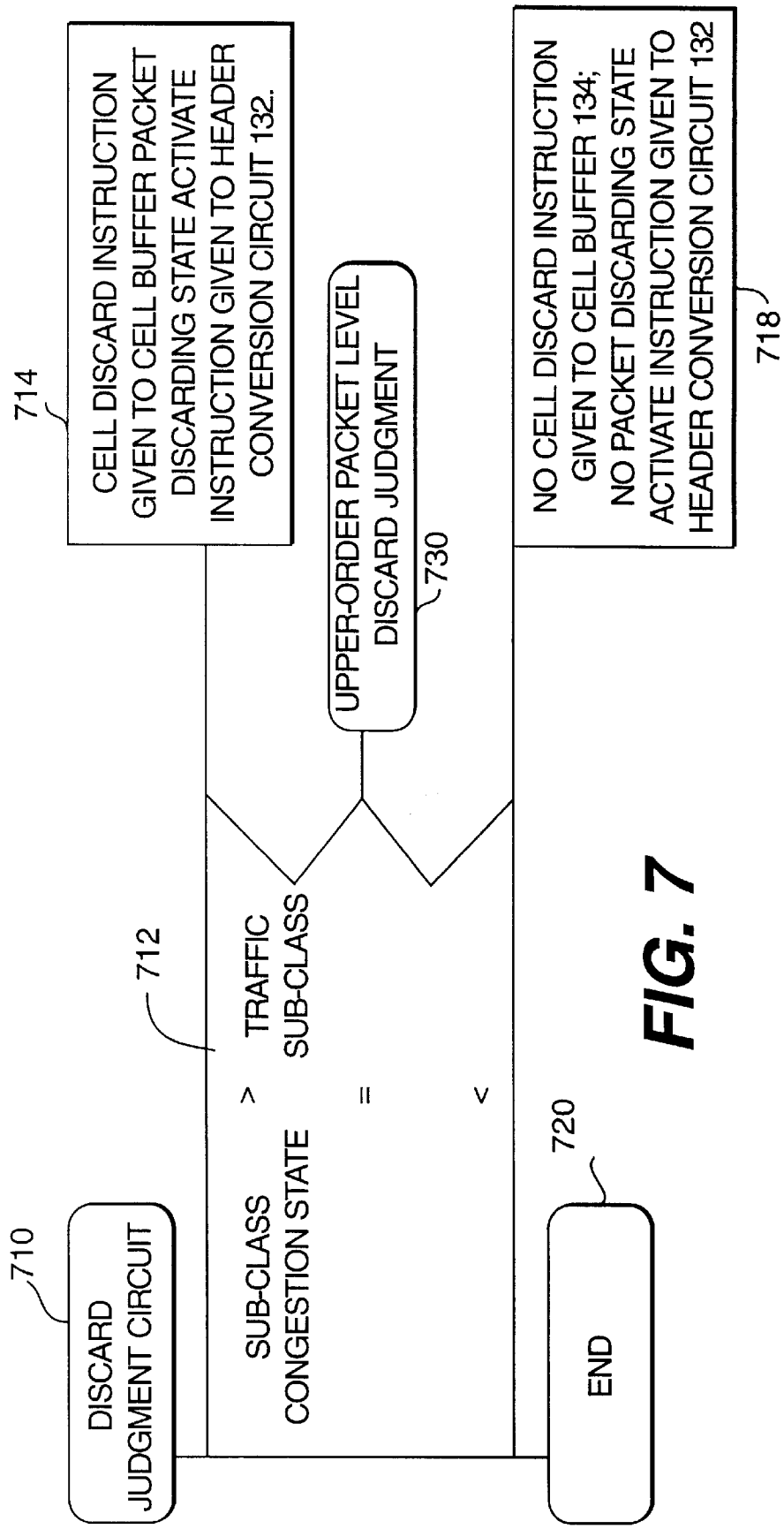
FIG. 7 is a flowchart showing the function of a packet discard judgment unit 410 of FIG. 4 according to the present invention.

FIG. 7 shows the operation of the packet discard judgment unit 410.

An upper-order packet level discard judgment (Step 730) shown in detail in FIG. 8 is made on a cell in which the sub-class congestion state equals the traffic sub-class (equal state) at Step 712 and when the condition is met, the upper-order packet level discard judgment is carried out. A cell in which the traffic sub-class is greater than the sub-class congestion state is not discarded (Step 718), whereas a cell in which the traffic sub-class is smaller than the sub-class congestion state is discarded (Step 714).

At the upper-order packet level judgment processing 730, when the packet-discarding state 228 received via the signal line 412 indicates that a cell is being discarded (Step 732) and when the PTI 214 is not the packet delimiter (Step 734), as shown in FIG. 8, a cell discard instruction is given to the cell buffer 134 and an instruction activated indicating the packet-discarding state is given to the header conversion circuit 132 (Step 736). Thus the state in which the packet is being discarded in the VCI within the header conversion circuit 132 is activated.

When the packet-discarding state 228 received via the signal line 412 indicates that no cell is being discarded (Step 732) and when the PTI 214 is the packet delimiter (Step 734), the result S' of division of S of the VCI cell discard threshold by the level F of the activated congestion state (subclass congestion state of FIG. 6) via the signal line 152 is found (Step 738), and the result S' is compared with the value of the output signal 324 of the counter 308 for each VCI (Step 740). In this case, only a shift operation is needed for the division if F is the second power of 2 ($2^F$), producing the effect of allowing the division to be operated in a high-speed switching time.

When it is determined that C>S' (C is the value of the counter 308) as a result of Step 740, even when a break of the upper-order packet is judged in Step 734 indicating that a break exists, the cell discard instruction is given (Step 736). When it is determined in Step 740 that C>S', but the cell is not the packet delimiter as determined by Step 742, the cell is not discarded and the processing is ended (Step 744). When it is determined that it is not true that C>S' as a result of Step 740, even when a break of the upper-order packet is determined in Step 734 for a cell being discarded (Step 732), or if a break is determined not to exist in Step 742 for a cell determined not to be discarded in Step 732, the cell discard instruction is not given but the whole processing is terminated (Step 744). Steps 738, 740 explain the operation of the VCI congestion level measurement circuit 440 and the rest explains the operation of the packet discard judgment unit 410.

Figure 9:
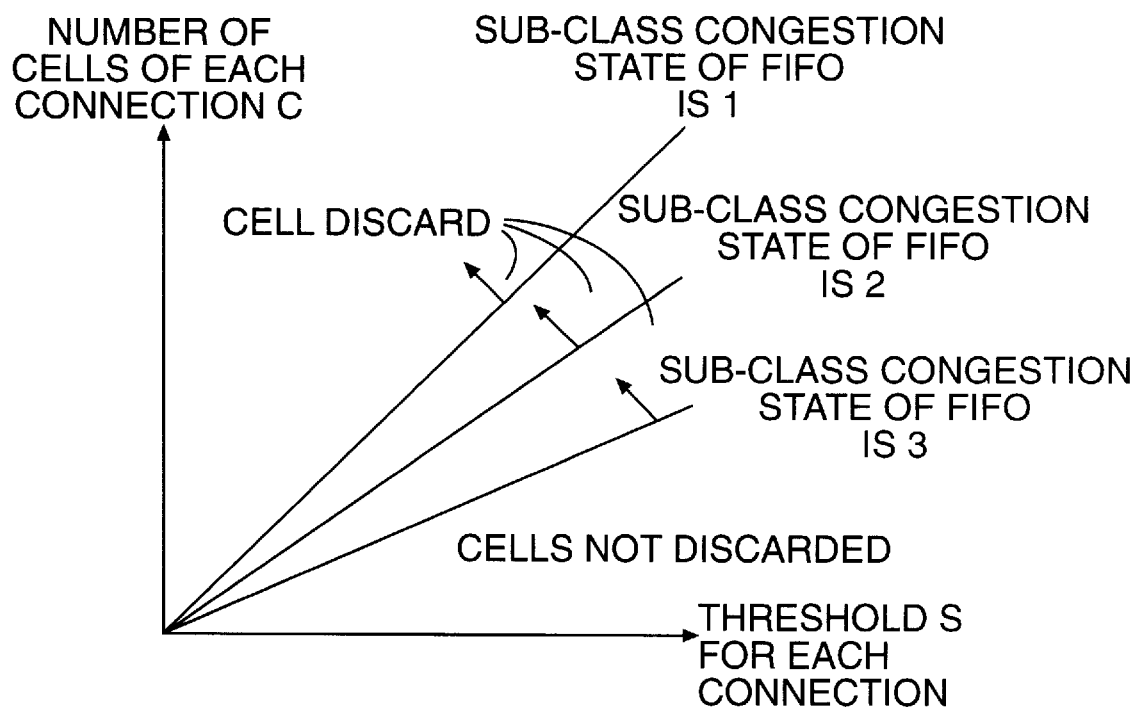
FIG. 9 is a graph showing the function of a VIC congestion level measurement circuit 440 of FIG. 4.

FIG. 9 shows the functions of Steps 738, 740. The discard judgment based on the relation between the threshold S for each connection and the number of cells C for each connection is dependent on the degree of the active subclass congestion state of the FIFO buffer 107 because of the acceleration step 738 in which S is divided by F and compared with C in Step 740. As a result, and as the congestion state (subclass) increases, the number of cases in which cells are discarded increases. Cells having a threshold below an active subclass congestion state (1, 2, 3 . . . ) are not discarded whereas cells above the line are discarded, as shown by the arrows. When the threshold S is equally set (subclass congestion state=1), impartiality for each connection can be realized. When a large threshold S is given to an important connection, the setting can be made such that the cell discard hardly occurs in comparison with the other connections.

When the congestion state is produced in the whole output port of the switch, the cell is discarded according to the output of the connection comparison means according to the present invention. In the sub-class of FIG. 6, the discard is started with the cells at the lower sub-class congestion state 1. When the degree of the congestion state increases despite the fact that cells are being discarded, the cells of even a higher sub-class are discarded. As the switch is recovered from the congestion state, the suspension of the discard is started with the cells of the higher sub-class and, as a result, the cells of the higher sub-class are protected from being discarded by the congestion state produced in the switch.

Although the cell buffer is provided for the output port interface in this embodiment of the invention, the invention is also applicable to a case that the cell buffer is provided for an input port interface or a case that the buffer is provided for both input and output port interfaces.

A description will subsequently be given of an ATM switching device with a cell buffer to be commonly used in a plurality of ports of another embodiment of the invention.

Figure 10:
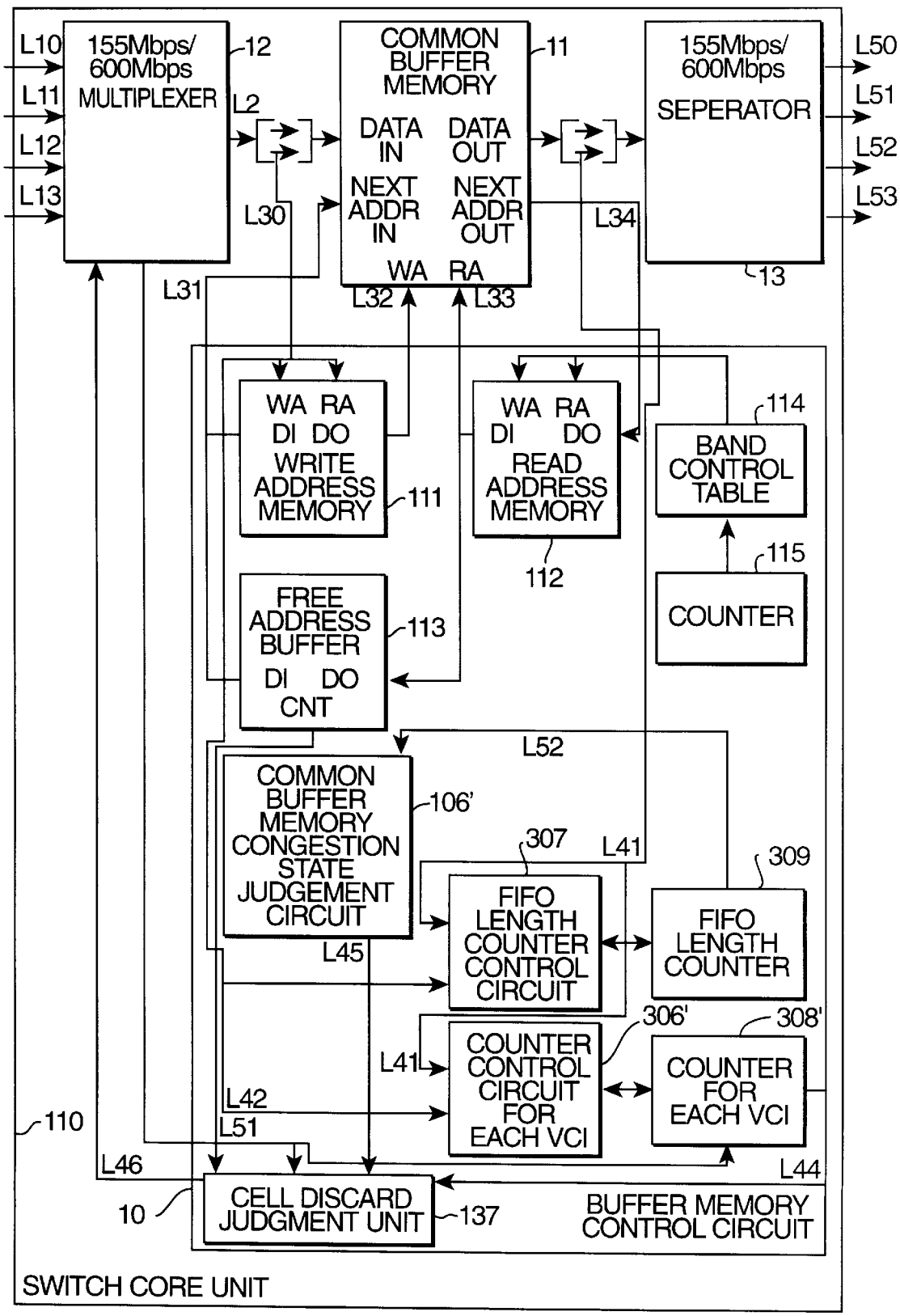
FIG. 10 is a block diagram of another packet switching device embodying the present invention.

In FIG. 10, reference numeral 110 denotes a common buffer switch unit as the principal part of the ATM switching device. The switch unit 110 is substituted for the switch core unit 120 of the switch 100 of FIG. 1 and in place of the cell discard judgment units 136 dispersedly arranged in the respective input line interface units 102 of FIG. 1, a cell discard judgment unit 137 for common use is provided for line interfaces.

A switch core unit comprises a 155 Mbps/600 Mbps multiplexer 12 connected to, for example, input lines L10–L13, a 600 Mbps/155 Mbps separator 13 connected to output lines L50–L53, a common buffer memory 11 and a buffer memory control circuit 10. Although the input line interface unit 120 shown in FIG. 1 has been inserted in each of the input lines L10–L13, this arrangement is omitted in FIG. 10.

The buffer memory control circuit 10 comprises a write address memory 111, a read address memory 112, a free address buffer 113, a band control table 114, a counter 115, a common buffer memory congestion state measurement circuit 106', a counter control circuit 306' for each VCI, a counter 308' for each VCI and a cell discard judgment unit 137.

The input cells subjected to header conversion in the input line interface unit (not shown) are input to the multiplexer 12 through input lines L10–L13 and output through a line L2 as a cell sequence in time series. The basic arrangement and operation of the switch core unit 120 shown in FIG. 10 are similar to those described in Japanese Patent Laid-Open No. 276943/1992 wherein write and read data to and from the common buffer memory 11 are controlled by the buffer memory control circuit 10.

In a cycle where a cell is written, the output port information (routing information) attached to the header is extracted from each cell that has been output from the multiplexer 12 to a line L2 and using the information as an address with line L30, the write address memory 111 is accessed and further the address thus read is given through a line L32 to the common buffer memory 11 as a write address WA. At this time, a free address to be utilized as a pointer address to the next cell is taken out of the free address buffer 113 for accumulating free addresses in the common buffer memory 11 and via a line L31, the free address is given as input data to the write address memory 111 and the common buffer memory 11 (NEXT ADDR IN).

The above pointer address, in place of the write address WA of this writing, is written in the same memory area in the write address memory 111 and when the next cell addressed to the same port arrives, the pointer address is changed to a write address WA to be newly written in the common buffer memory 11. On the other hand, the pointer address written together with the input cell in pair in the common buffer memory 11 is read from the common buffer memory 11 in a cell read cycle, which will be described later, and held in the read address memory 112. Thus the pointer address indicative of a cell to be read next time in accordance with the output port is stored in the read address memory 112 each time the cell is read. A queued chain (list structure) which is logically connected at the next address is formed in the common buffer memory 11 in accordance with each output port.

In a read cycle to be effected alternately with the cell read cycle, the band control table 114 is accessed, using the output value (count) of the counter 115 which performs the count-up operation in each cell read cycle as an address. The above counted value corresponds to the output port of a cell to be selected by the separator 13 and an address for designating a specific queued chain used to read the cell is prestored in the band control table 114 according to the counted value.

The queued address read from the band control table 114 is given to the read address memory 112 as a read address (RA) and a write address (WA) and a pointer address indicative of the first cell of the specific queued chain is read from the read address memory 112. The pointer address is given to the common buffer memory 11 as a read address via a line L33, whereby the first cell of such a specific queued chain is read. The pointer address is stored in the free address buffer 113 via the line L33 since the pointer address becomes free after the cell from the common buffer memory 11 has been read. The next pointer address together with the above cell in pair has been read from the common buffer memory 11 and this pointer address is written in the read address memory 112 as a new pointer address.

Through the operation described above, a cell is newly added to the end of a queued chain in each write cycle within the read address memory 112 and unless the designated queued chain is empty, the first cell in a queued chain is taken out in each read cycle.

The common congestion state measurement circuit 106' functions similarly to the FIFO buffer congestion state measurement circuit 106' of the switch core unit shown in FIG. 1, receives the used quantity of the buffer for each port via a line L52 from a FIFO buffer length counter 309 and outputs the congestion state to a line L45. Although the capacity of the FIFO buffer circuit 302 has been the maximum value of the FIFO buffer length counter 304 in the FIFO buffer congestion state measurement circuit 106 of FIG. 1, a value greater than the quotient of division of the capacity of the whole common buffer memory 11 by the number of ports can be set as the set value of the FIFO buffer length threshold register 510 corresponding to the used quantity of the buffer for each port in the case of the FIFO buffer length counter 309; this is advantageous because the utilization factor of the buffer during congestion is improvable.

In a cycle where the cell is written in the common buffer memory 11, the counter control circuit 306' for each VCI counts up the cell count within the counter 308' for each VCI corresponding to the VCI information fed from a line L42. In a cycle where the cell is read from the common buffer memory 11, conversely, the counter control circuit 306' for each VCI counts down the cell count within the counter 308' for each VCI corresponding to the VCI information fed from a line L41. When VCI information on the cell which is being multiplexed by the multiplexer 12 is fed, the counter 308 for each VCI feeds a corresponding cell count value to a line L44.

In a cycle where the cell is written in the common buffer memory 11, an FIFO buffer length counter control circuit 307 counts up the cell count value of each port within the FIFO buffer length counter 309 corresponding to the port information fed from the line L42. In a cycle where the cell is read from the common buffer memory 11, conversely, the FIFO buffer length counter control circuit 307 counts down the cell count value of each port within the FIFO buffer length counter 309 corresponding to the port information fed from a line L41. The cell count value of each port, that is, the value of the FIFO buffer length is transferred via the line L52 to the common buffer memory congestion state judgment circuit 106.

The cell discard judgment unit 137 which is similar in construction to the cell discard judgment unit 136 shown in FIG. 1 receives via the line L43 the PTI 214 of the cell which is being multiplexed by the multiplexer 12, the output VCI 226, the output port 221, the traffic class 222, the traffic class 225, the cell discard value 227 and the packet discard information 228; via the line L45, the congestion state information of the common buffer memory; via the line L44, the output VCI 226 of the cell being multiplexed by the multiplexer 12; and the cell count value corresponding to the above VCI 226. The line L45 is a signal line corresponding to the line 152 of FIG. 4. The cell discard judgment unit 137 which is different from the cell discard judgment unit 136 of FIG. 4 receives the blank address quantity (blank buffer capacity) of the whole common buffer memory 11 from the blank address buffer 103 through the line L51 and when the blank addresses are filled up, unconditionally discards any other cell which is being multiplexed by the multiplexer 12.

Although the cell switch of NXN has been described as one of the embodiments of the present invention by way of example, the cell discard control according to the present invention is applicable to, for example, communication apparatus such as an N-input-1-output multiplexer, an 1-input-1-output speed conversion buffer or the like.

Although a description has been given of a mode where the upper-order protocol packet delimiter is recognized and where the cell is discarded in units of a packet, the cell discard may immediately be started without waiting for the upper-order protocol packet delimiter when congestion occurs, and, with respect to a packet lacking part of the cells, such a discard mode may also be used so that discard is continued up to the packet delimiter cell. Further, the discard mode may be switched selectively in accordance with the congestion state or the cell may be discarded without recognition of the upper-order protocol packet.

As set forth above, according to the first embodiment of the present invention, the cell discard is started with a connection having a low (port or traffic subclass) threshold, referring to the preset threshold information for each connection when the congestion state occurs. If a plurality of connections have an equal threshold, the cell discard of a connection having more staying cells is given priority. When an order of priorities has been affixed to the threshold information, the traffic of a connection having a high priority is protected by giving it priority to discard the cell of a connection having a low priority.

Also, as set forth above with respect to the embodiments of the invention of FIGS. 1–9, congestion control is performed with the line interface unit LIFi by comparison of the traffic subclass information 225 to a subclass congestion state determined by the FIFO buffer 107; and by comparison of a VCI cell discard threshold 227 with a count for each VCI provided by the FIFO buffer 107. By following the procedure set forth in FIGS. 7 and 8, a cell discard decision is made that is transferred to the cell buffer 134 and also the header conversion circuit 132. However, the congestion control can be performed without comparison of the traffic subclass 225 with the subclass congestion state, or alternatively without the VCI cell discard threshold (227) comparison with the VCI counter according to the following additional embodiments of the invention.

In the following description of the embodiments of the invention, the components that are the same as those described with respect to the embodiment of the invention shown in FIGS. 1–9 are not discussed further, since these components have the same function and are labeled with the same reference numbers for the following embodiments as were used in the description of the first embodiment of the invention.

Figure 11A:
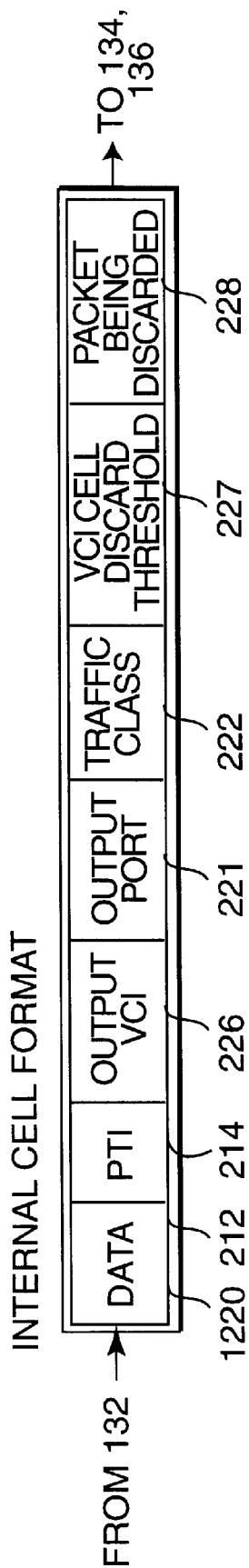
FIG. 11A shows an internal cell format modified with respect to that shown in FIG. 2B.

FIG. 11A shows a modified internal cell format 1220 for a cell after conversion by the header conversion circuit 132. The internal cell format 1220 shown in the FIG. 11A differs from that of the internal cell format 220 shown in FIG. 2B in that no traffic subclass information 225 is included in the cell 1220. The other information of the internal cell format of cell 1220 is the same as that shown in FIG. 2B.

Figure 11B:
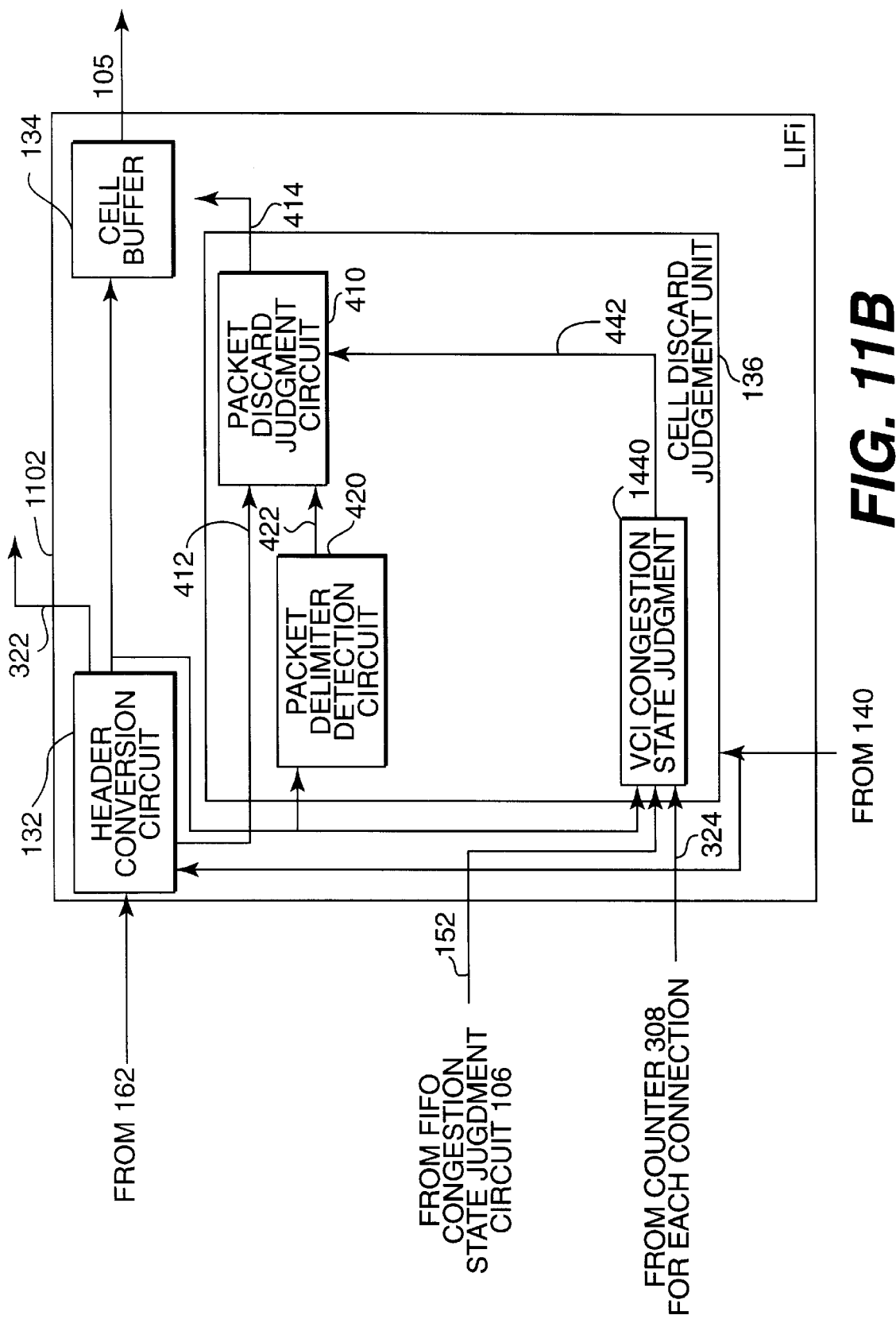
FIG. 11B shows an input line interface unit of another embodiment of the invention.

In FIG. 11B, the input line interface unit LIFi 1102 differs from the LIFi 102 of the first embodiment of the invention in that there is no FIFO level measurement circuit and consequently there is no traffic subclass information to be received from the header conversion circuit 132. As a result, the packet discard judgment circuit 410 receives only the judgment of the VCI congestion state judgment circuit 1440.

Figure 11C:
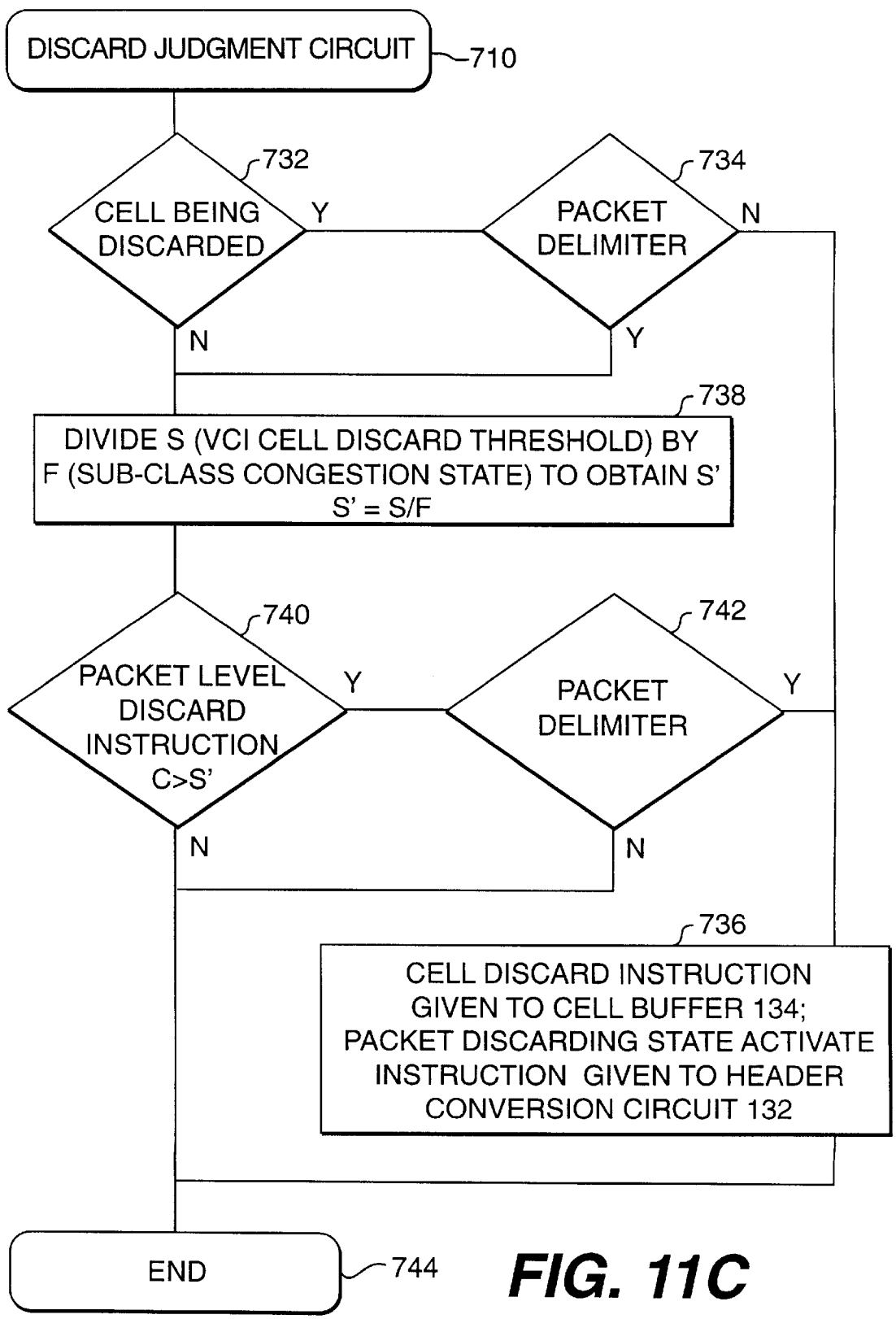
FIG. 11C is a flow chart showing the steps performed in judging whether a cell is to be discarded according to another embodiment of the invention.

FIG. 11C shows the steps performed in judging whether a cell is to be discarded. In particular, the steps 738' and 740' are determined by the VCI congestion state judgment circuit 440. In this embodiment, the value of the counter 308 is compared with S' to determine whether a packet level discard instruction should be activated and given to the header conversion circuit 132 (only if the cell also is detected to have a packet delimiter in step 742). The value S' to which the count of the VCI counter 308 is compared is obtained by dividing the VCI cell discard threshold S by a value F, which according to the first embodiment of the invention is the FIFO buffer subclass congestion state currently activated. This accelerates or increases the number of cells discarded by effectively lowering the VCI cell discard threshold. Although in this embodiment and in the first embodiment of the invention, the value by which S is divided is F (S'=S/F), another constant may be used that is input to the VCI congestion state judgment circuit, such as a constant input by the network control terminal 180.

As shown in FIG. 11C, the first step of the discard judgment processing begins with a step 710. According to this embodiment, there is no processing of a decision comparing the FIFO buffer state congestion level with the subclass information 225 as in the flow chart of FIG. 7 of the first embodiment. Accordingly, the congestion control is maintained only on the basis of monitoring the VCI count for each VC, in comparison with the VCI cell discard threshold value.

In the embodiment of the invention disclosed in FIGS. 11A–11C, there is no reliance on the traffic subclass information for the congestion control. However, in the embodiment of the invention disclosed in FIGS. 12A–12D, there is no reliance on the VCI cell discard threshold information in discard judging steps. Accordingly, the embodiment shown in FIGS. 12A–12D show an embodiment of the invention that manages congestion control using only traffic subclass information that is compared with the FIFO buffer subclass congestion state in the LIFi.

Figure 12A:
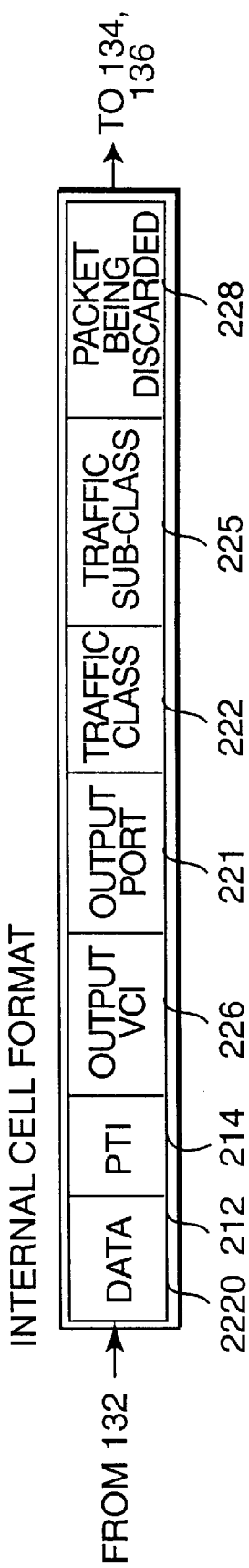
FIG. 12A shows an internal cell format according to another embodiment of the invention.
Figure 12B:
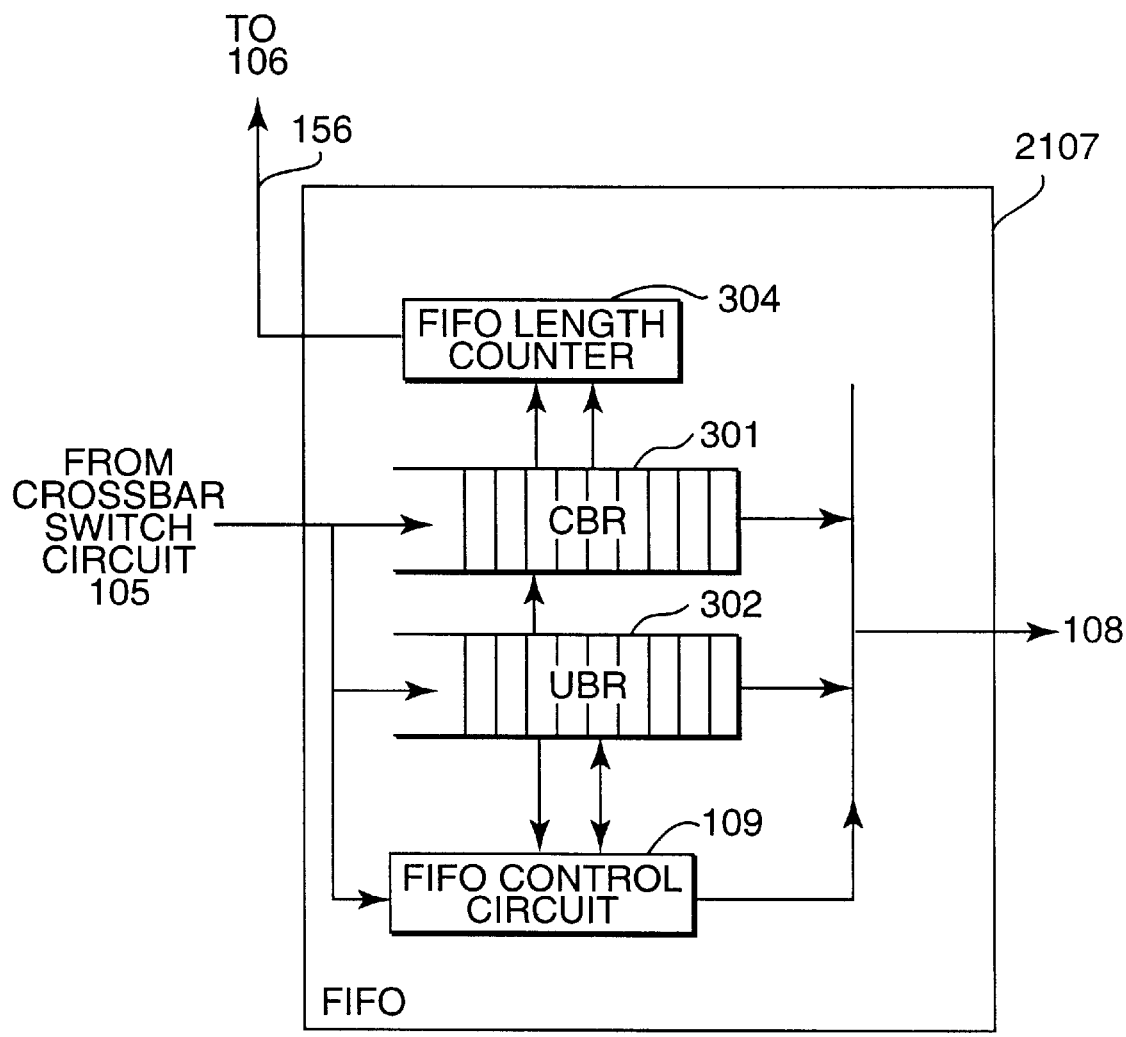
FIG. 12B shows a modified FIFO buffer as compared with the FIFO buffer shown in FIG. 3.

As shown in FIG. 12A, the internal cell format 2220 has all of the information identified in FIG. 2B showing the internal cell format of a cell 220 according to the first embodiment of the invention except for the VCI cell discard threshold information 227. As a result, as shown in FIG. 12B, the FIFO buffer 2107 is modified as compared with the FIFO buffer 107 shown in FIG. 3 in that no counter for each VCI 308 and correspondingly no counter control circuit 306 are provided. Accordingly, the FIFO buffer 2107 merely counts the length of the buffers 301 and 302 and provides an output signal 156 that is transmitted to FIFO congestion state judgment circuit 106.

Figure 12C:
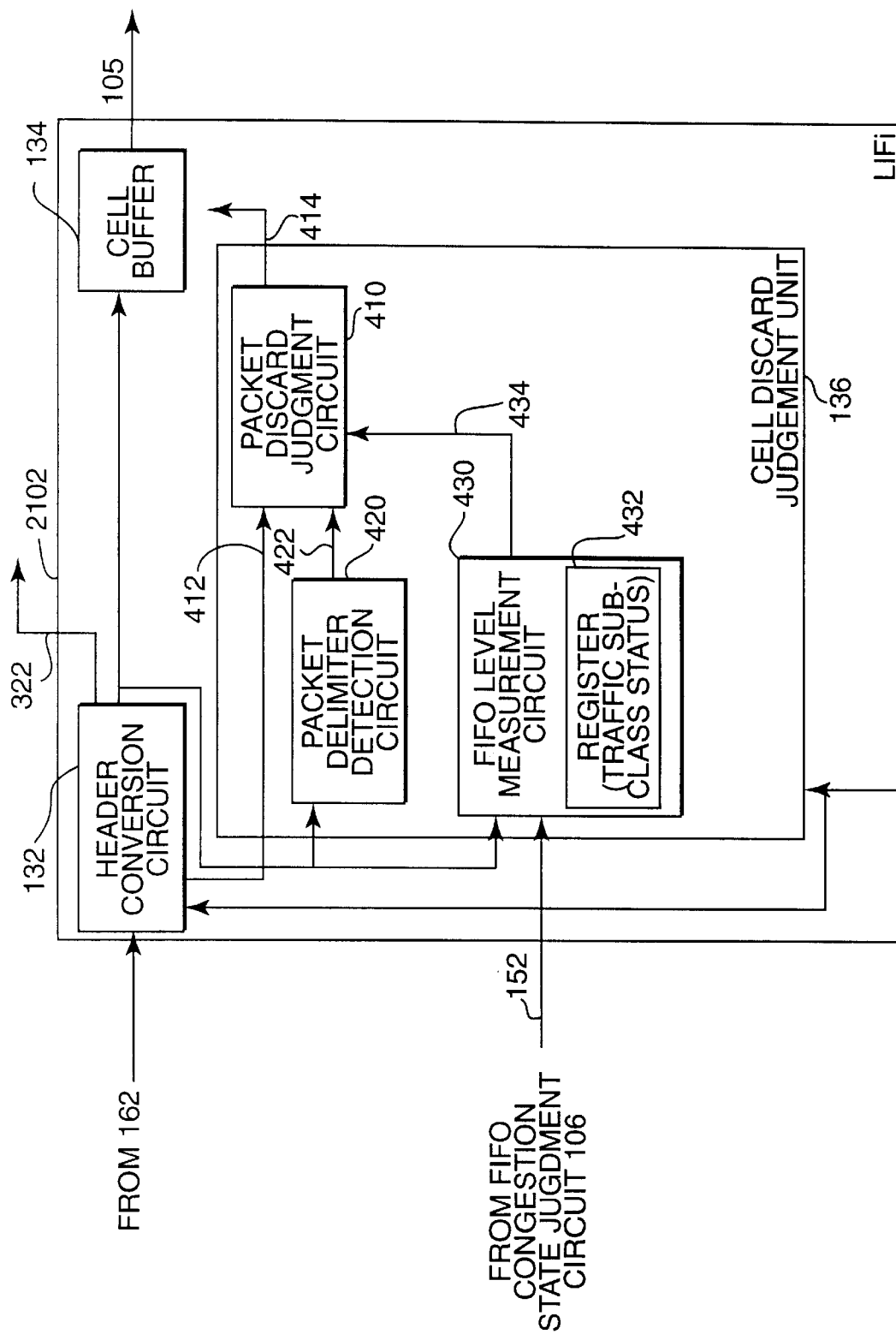
FIG. 12C shows the input line interface unit LIFi according to another embodiment of the invention.

FIG. 12C shows the input line interface unit LIFi 2102 according to this embodiment of the invention, which does not have a VCI congestion state judgment circuit as does the LIFi 102 of FIG. 4. The FIFO level measurement circuit 430 receives the FIFO congestion state judgment circuit output 106 through input signal line 152 and registers the value in register 432. Then, the registered FIFO subclass congestion state held in register 432 is compared with the traffic subclass information 225 of cell 2220 to make a packet discard judgment.

Figure 12D:
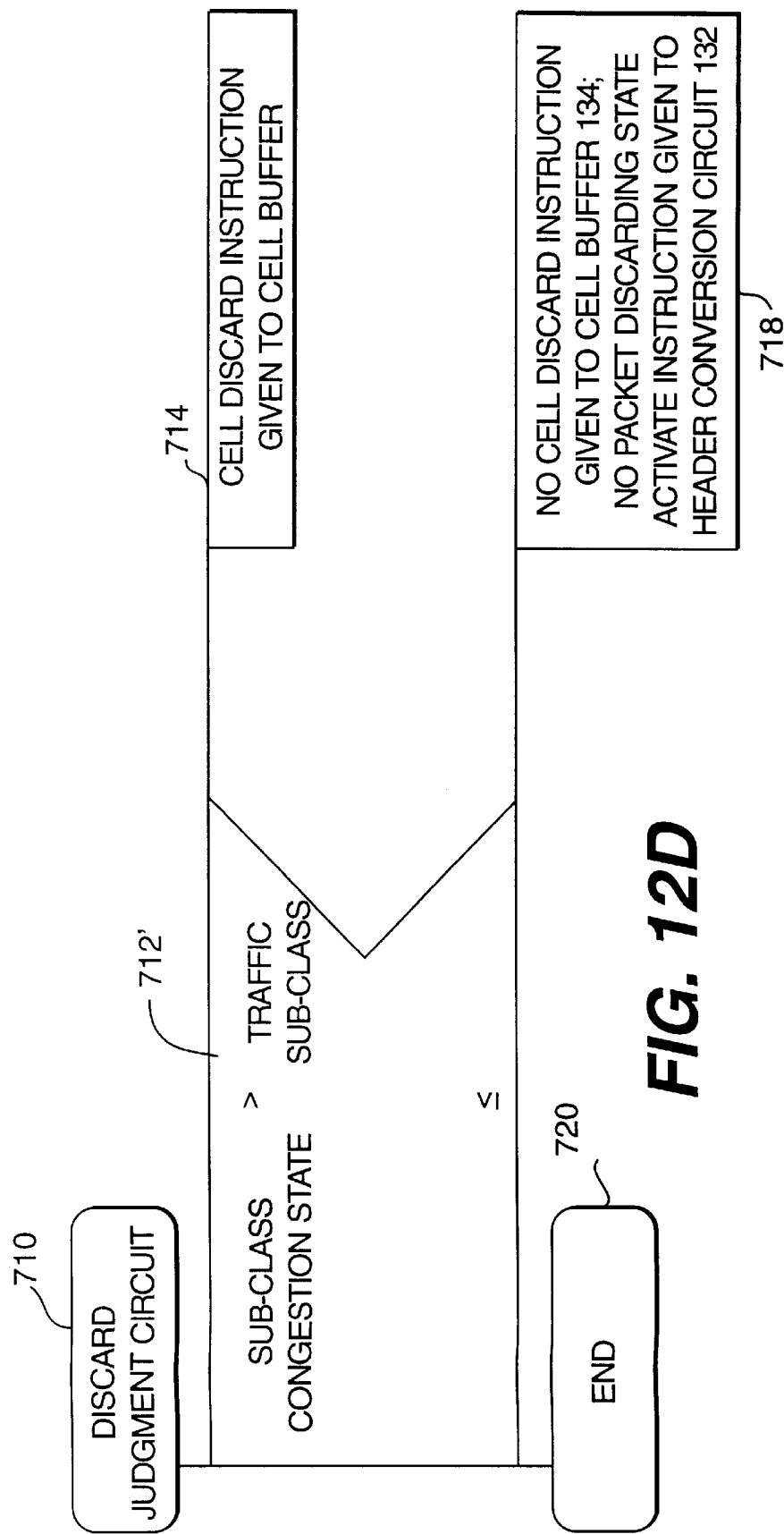
FIG. 12D discloses the flow in which a decision is made regarding a cell discard instruction according to another embodiment of the invention.

FIG. 12D discloses the decision made in step 712' that either provides a cell discard instruction that is given to the cell buffer when the subclass congestion state exceeds the traffic subclass (step 714); or ensures that no cell discard instruction is given to the cell buffer and no packet discarding state is activated by the header conversion circuit 132 when the subclass congestion state is less than or equal to the traffic subclass.

According to the embodiment of the invention set forth in FIGS. 12A–12D, therefore, the VCI cell discard threshold information is not needed to make a cell discard judgment.

Figure 13A:
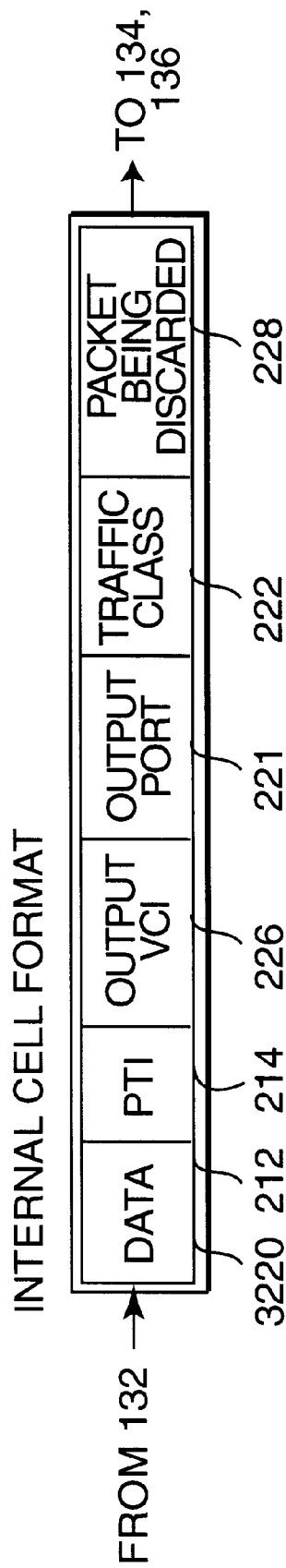
FIG. 13A shows an internal cell format according to another embodiment of the invention.
Figure 13B:
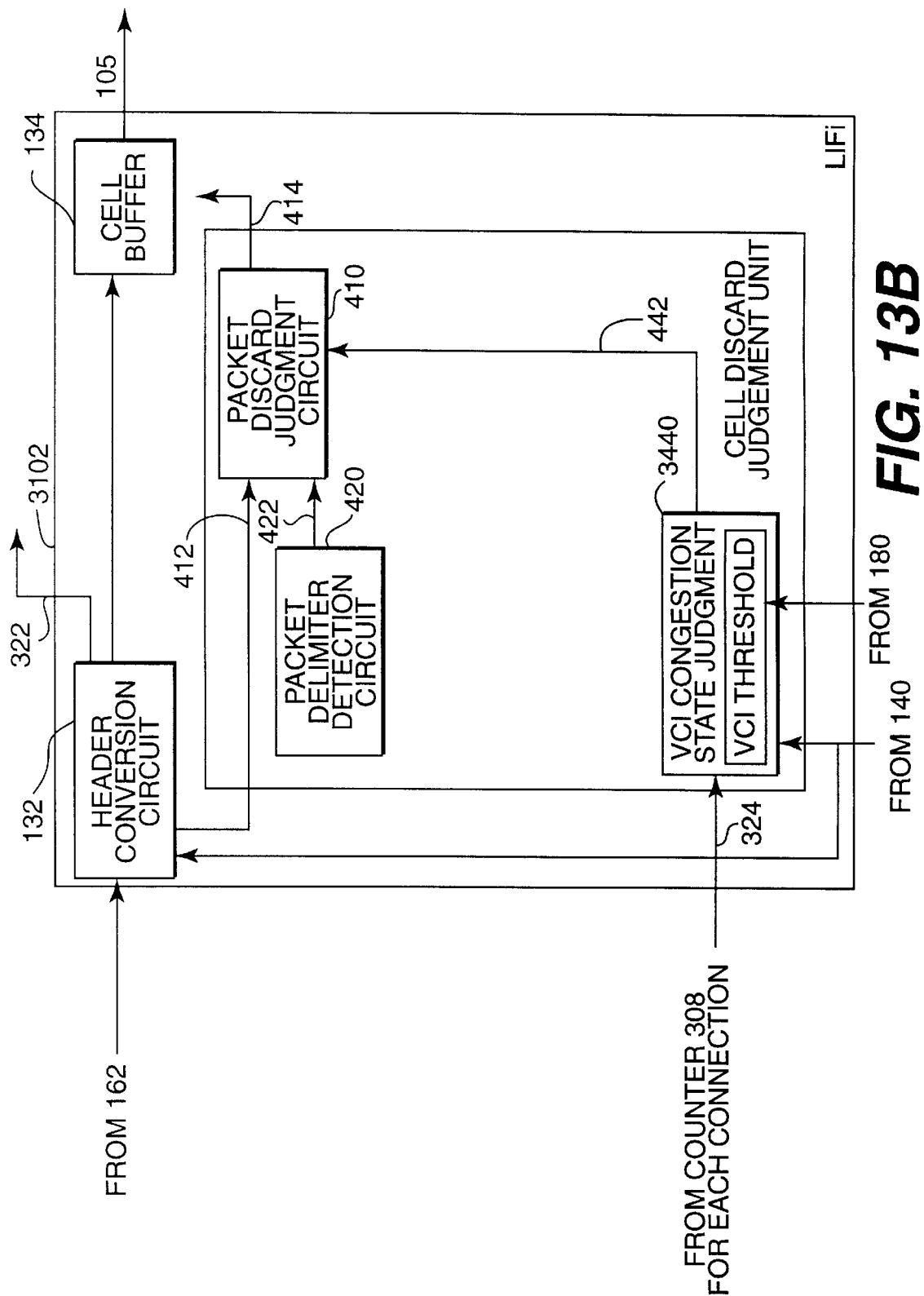
FIG. 13B shows the input line interface unit LIFi according to another embodiment of the invention.
Figure 13C:
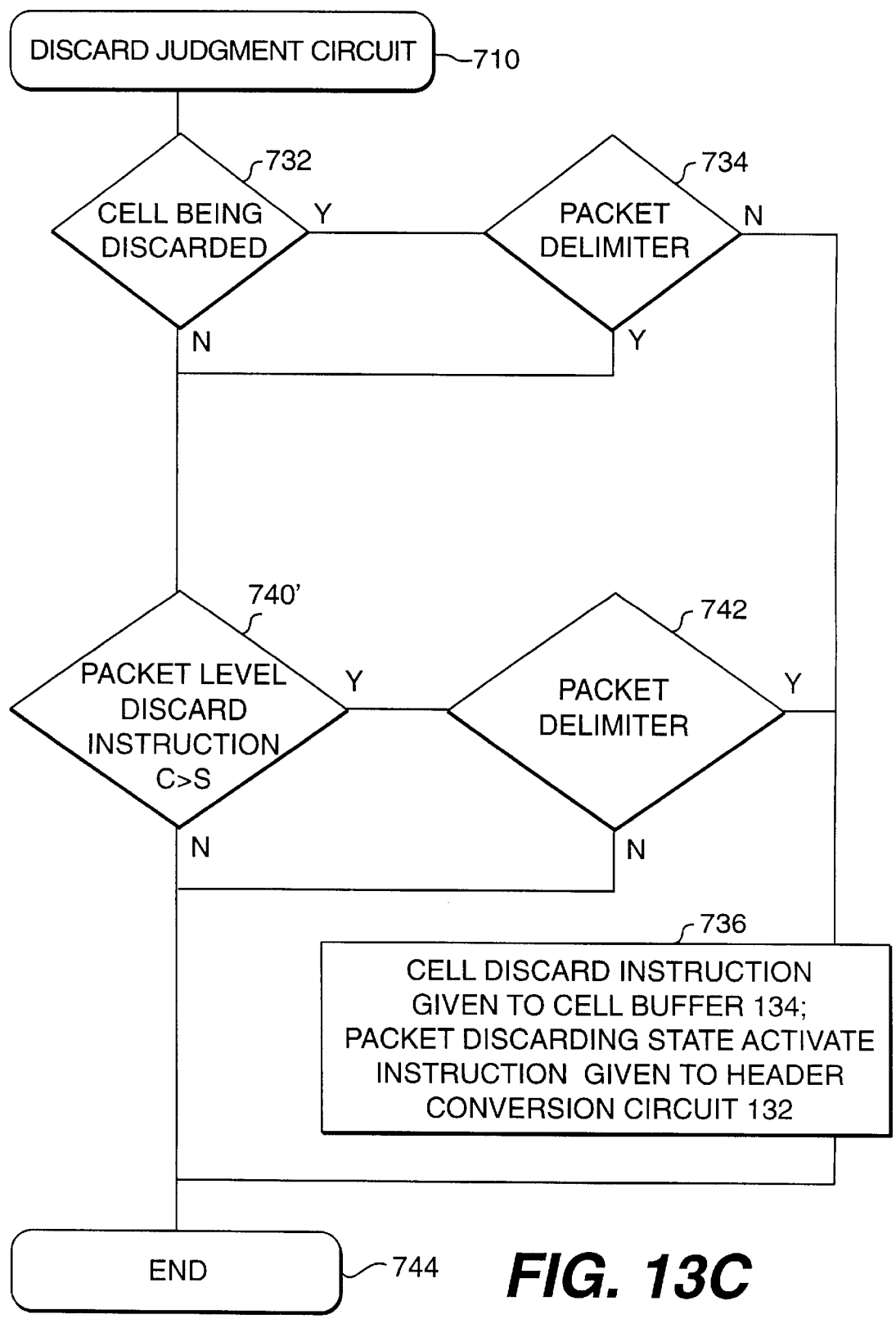
FIG. 13C discloses the flow in which a decision is made regarding a cell discard instruction according to another embodiment of the invention.

In yet another embodiment of the invention shown in FIGS. 13A–13C, the internal cell format 3220 differs from the internal cell format 220 shown in FIG. 2B in that neither of the traffic subclass information 225 or the VCI cell discard threshold information 227 is provided for the cell. As shown in FIG. 13B, the fixed VCI threshold is set in a register in VCI congestion state judgment circuit 3440. The fixed VCI threshold for each connection on the same port has the same value. The VCI threshold is set by the network control terminal 180.

In the input LIFi 3102 shown in FIG. 13B, the VCI congestion state judgment circuit 3440 performs the processing for determining whether a packet should be discarded by following the flow of FIG. 13C. In this embodiment, there is no FIFO level measurement circuit as shown by FIG. 13B, and there is no need for a FIFO length counter in the FIFO buffer 107.

As shown in FIG. 13C, the discard judgment is made by the discard judgment circuit in Step 710, followed by Steps as shown in the figure, which are the same as those previously discussed with respect to FIG. 8. However, in a Step 740', a packet level discard instruction is performed which compares C, the value of counter 308, with the value S, which is the fixed VCI threshold. Optionally, the VCI cell discard threshold S can be divided by F to obtain the value S', however this is not shown in FIG. 13C, which does not include a Step 738. However, since the VC threshold can be changed in the present embodiment by the network control terminal 180, it may become unnecessary to include the cell discard acceleration step.

Figure 14A:
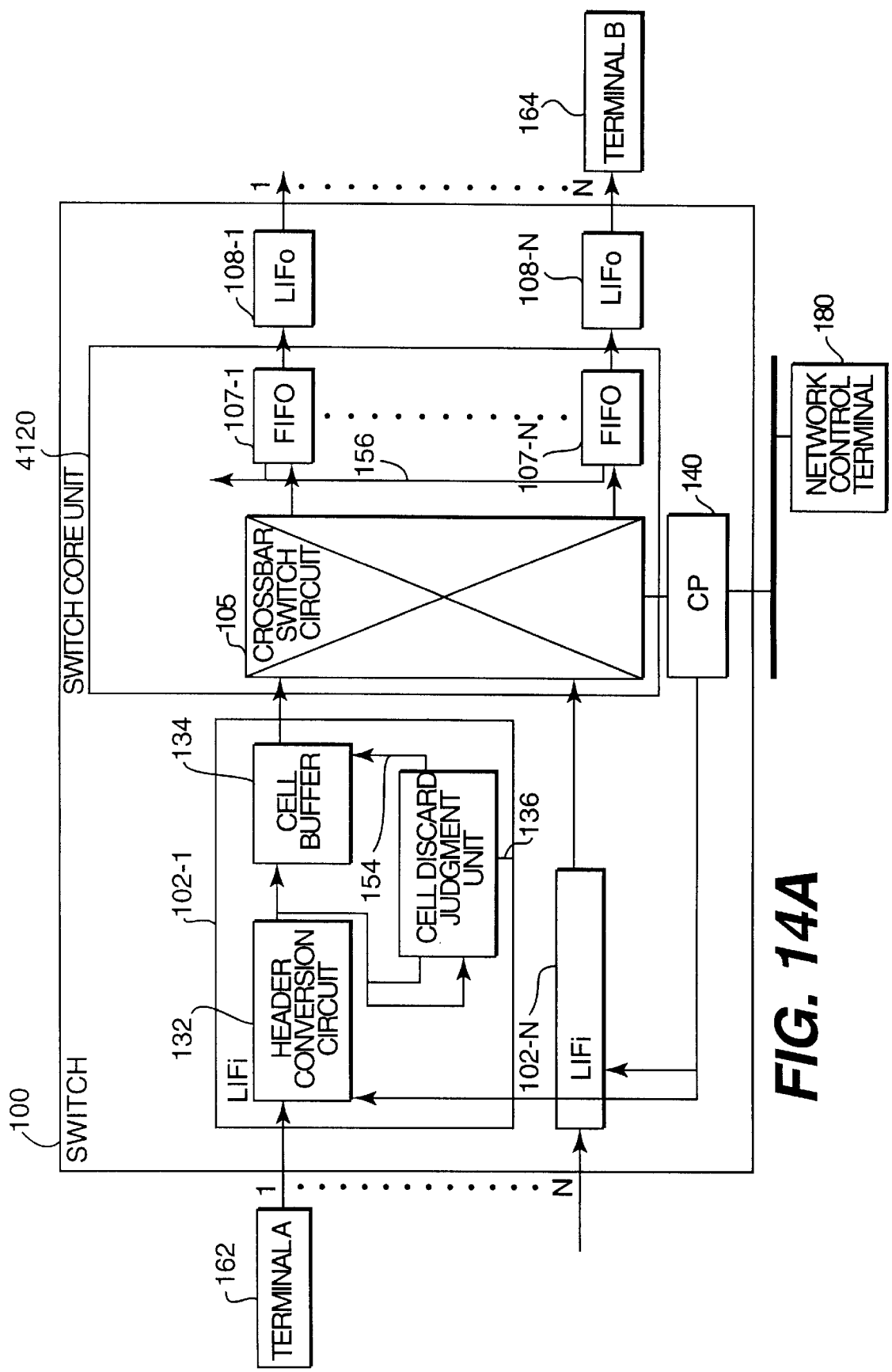
FIG. 14A shows a switch core unit of another embodiment of the invention that differs from that of FIG. 1.
Figure 14B:
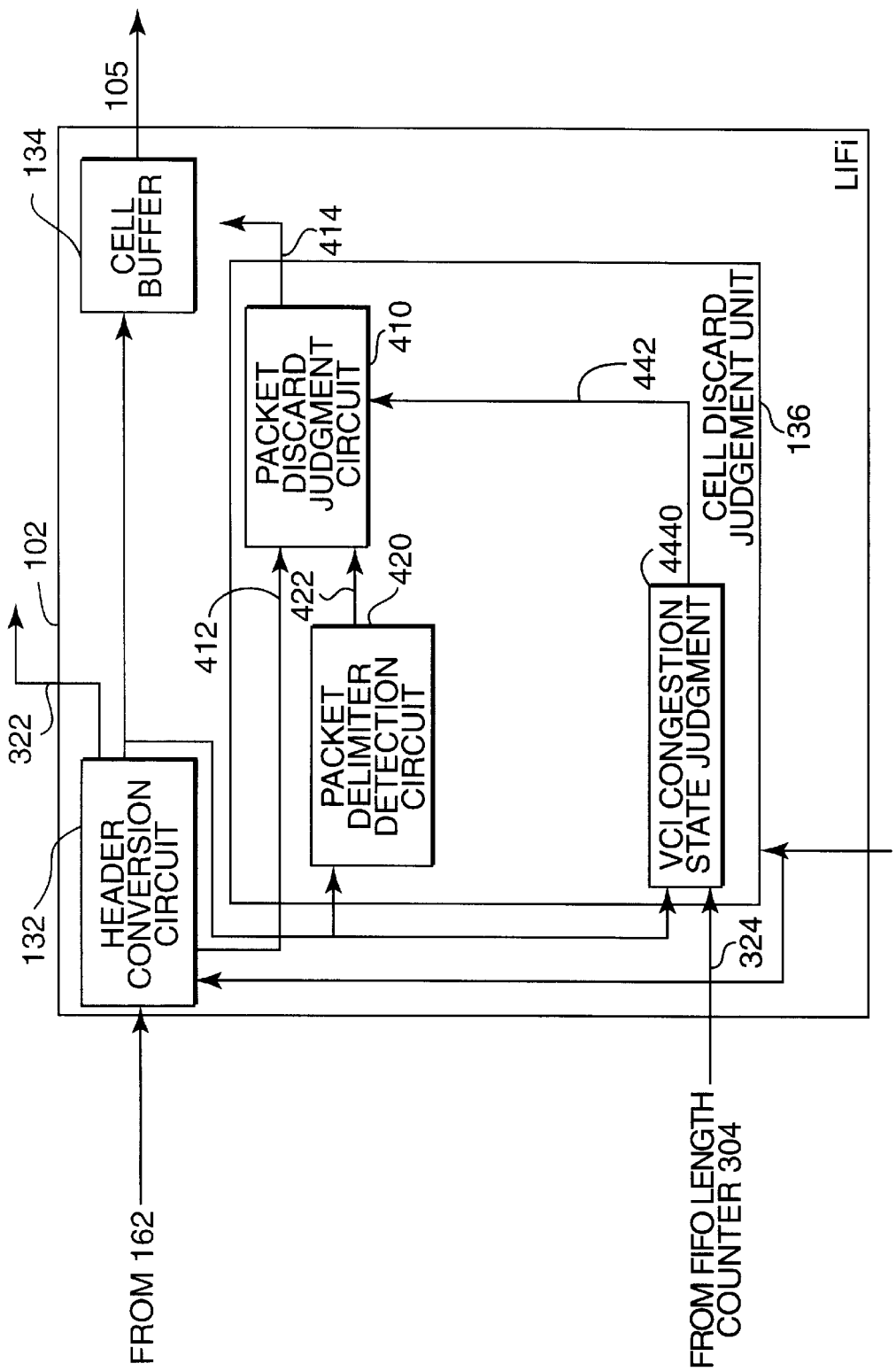
FIG. 14B shows a VCI congestion state judgment circuit

FIGS. 14A–14D disclose yet another embodiment of the present invention in which the internal cell format is the same as that as shown in FIG. 11A, i.e. without any traffic subclass information 225 or alternatively is set by the network control terminal 180. In this embodiment, as shown in FIG. 14A, the switch core circuit 4120 of the switch 4100 does not include a FIFO congestion state judgment circuit 106 since no port threshold congestion control is used according to this embodiment. Rather, as shown in FIG. 14B, the VCI congestion state judgment circuit 4440 receives an input 304 from the FIFO length counter over signal line 324 and compares this value to the VCI cell discard threshold 227 obtained from the header conversion circuit 132 or a fixed VCI threshold set by the terminal 18.

Figure 14C:
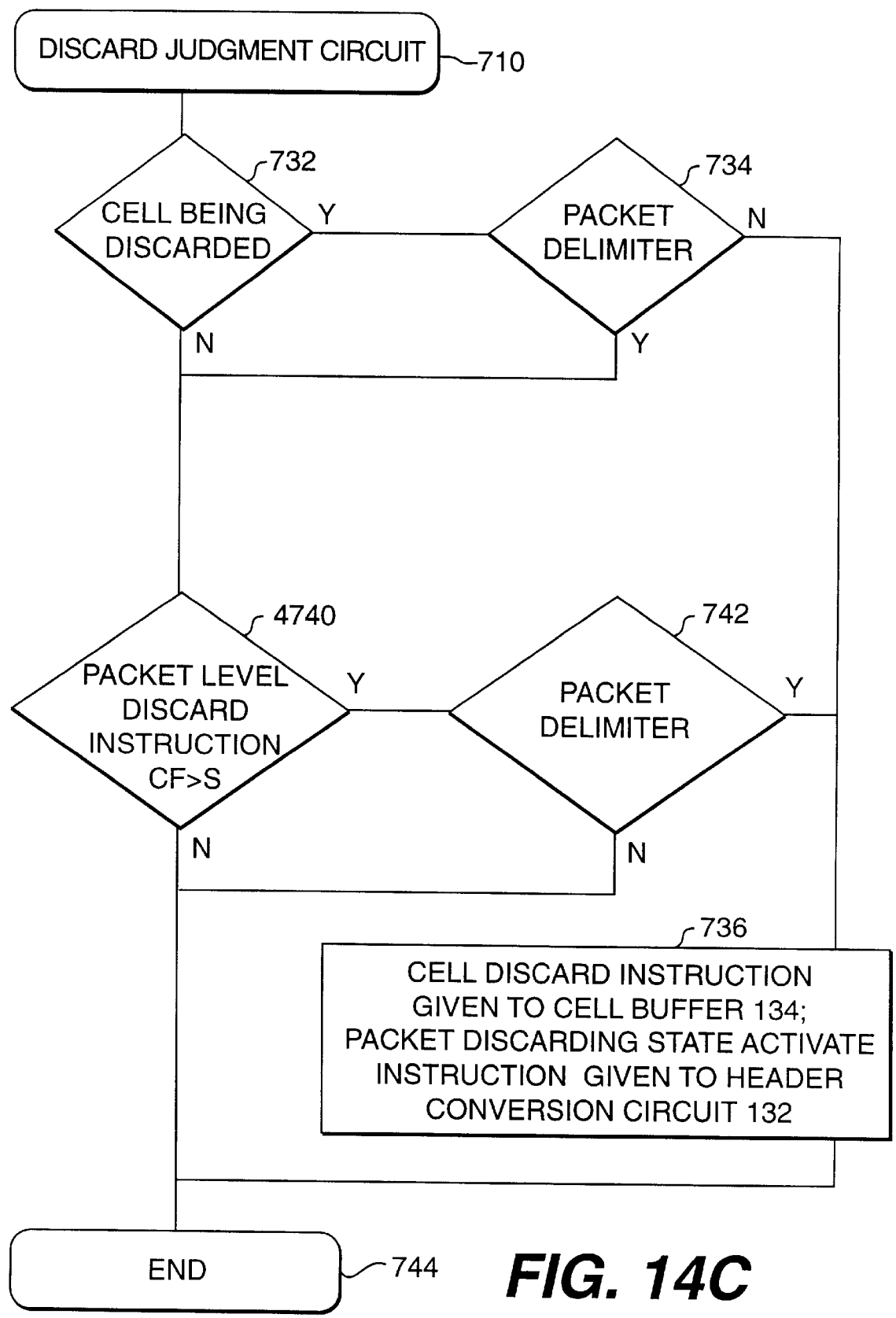
FIG. 14C shows the steps performed in determining cell discard judgment according to another embodiment of the present invention.

FIG. 14C shows the steps performed in determining the cell discard judgment, which begins with the discard judgment circuit 710, followed by Steps similar to those explained with reference to FIG. 8, and for which no further explanation is provided as a result, and by a Step 4740. In Step 4740, the packet level discard instruction is performed which includes comparing the value of the FIFO buffer length counter 304 (value CF) with the VCI cell discard threshold 227 or the fixed VCI threshold set by the network control terminal 180 (value S).

The embodiments of the invention have been disclosed as being composed of circuits, devices and units as well as other specific hardware with reference to flow charts and methods for performing the objects of the invention. It is understood that the packet switching device of the different embodiments of the invention can be embodied by hardware components or by software implemented on a microprocessor or computer and by a combination of both hardware and software.

While preferred embodiments have been set forth with specific details, further embodiments, modifications and variations are contemplated according to the broader aspects of the present invention, all as determined by the spirit and scope of the following claims.

What is claimed is:

1. A cell switching system for controlling transfer of ATM (Asynchronous Transfer Mode) cells wherein each cell has a header portion and a data portion with a message, comprising:

a plurality of input line interfaces for receiving cells from lines;

a plurality of output line interfaces for outputting cells to lines;

a plurality of output buffers corresponding to the respective output lines, each of the output buffers having a first counter counting the number of cells held therein and a second counter counting the number of cells held therein for each connection;

a switch connected to the input line interfaces and the output buffers, for switching cells from the input line interfaces to any of the buffers; and a congestion state judgment unit connected to the buffers and the input line interfaces, for judging congestion state of the output buffers based on values from the first counters;

wherein each of input line interfaces includes a cell discard judgment unit connected to each of the second counters and the congestion state judgment unit, for judging whether to discard inputted cells or not for each connection by comparing values from the second counters with a cell discard threshold information for each connection, and changing the cell discard threshold information based on the congestion state from the congestion state judgment unit; and wherein each of the input line interfaces selectively discards inputted cells without transmitting the cells to the switch for each connection based on the judgment of the cell discard judgement unit.

2. A cell switching system according to claim 1, wherein the cell discard threshold information is determined by a cell discard threshold for each connection included in a control message for setting up a call and the congestion state.

3. A cell switching system according to claim 1, wherein each of said input line interfaces includes a cell buffer connected to the cell discard judgment unit, and wherein if the cell discard judgment unit judges to discard cells of a connection, the cell buffer receives a signal for indication of discarding cells of the connection and discards the cells of the connection.

4. A cell switching system according to claim 1, wherein each cell discard judgment unit judges to discard a cell if the cell contains a first block of an upper-order packet and it judges not to discard a cell if the cell does not contain the first block of the upper-order packet.

5. A cell switching method of controlling transfer of ATM (Asynchronous Transfer Mode) cells at a cell switching node that has a plurality of input line interfaces, a plurality of output line interfaces, a plurality of output buffers corresponding to the respective output lines, a switch connected to the input line interfaces and the output buffers, wherein each cell has a header portion and a data portion with a message, the method comprising the steps of:

counting the number of cells held in the output buffers for each output buffer;

counting the number of cells held in the output buffers for each connection;

judging congestion states of the output buffers for each output buffer based on the number of cells counted for each connection at each input line interface;

discarding cells at each input line interface if the number of the cells counted for each connection is larger than a cell discard threshold information; and changing the cell discard threshold information based on the congestion state at each input line interface.

6. A cell switching method according to claim 5, wherein the cell discard threshold information is determined by a cell discard threshold for each connection included in a control message for setting up a call and the congestion state.

7. A cell switching method according to claim 5, further comprising the step of discarding a cell at each input line interface if the cell contains a first block of an upper-order packet.

* * * * *